(12) United States Patent
Bland

(10) Patent No.: US 12,352,250 B2
(45) Date of Patent: Jul. 8, 2025

(54) BLAND/EWING CYCLES FOR CHP AND CC PROCESSES

(71) Applicant: Joseph Barrett Bland, Sacramento, CA (US)

(72) Inventor: Joseph Barrett Bland, Sacramento, CA (US)

(*) Notice: Subject to any disclaimer, the term of this patent is extended or adjusted under 35 U.S.C. 154(b) by 0 days.

(21) Appl. No.: 18/095,463

(22) Filed: Jan. 10, 2023

(65) Prior Publication Data

US 2025/0116259 A1    Apr. 10, 2025

Related U.S. Application Data

(60) Provisional application No. 63/298,174, filed on Jan. 10, 2022.

(51) Int. Cl.
*F01K 3/18* (2006.01)
*F03G 7/06* (2006.01)

(52) U.S. Cl.
CPC ................ *F03G 7/06113* (2021.08)

(58) Field of Classification Search
CPC ............ F03G 7/06113; F01K 3/188
See application file for complete search history.

(56) References Cited

U.S. PATENT DOCUMENTS

| | | | |
|---|---|---|---|
| 3,067,594 A | 12/1962 | Bland et al. | |
| 3,198,710 A | 8/1965 | Long | |
| 3,225,538 A * | 12/1965 | Bland | F01K 3/188 |
| | | | 60/649 |
| 3,263,414 A | 8/1966 | Herbst | |
| 3,273,332 A | 9/1966 | Poudrier | |
| 3,370,420 A | 2/1968 | Johnson | |
| 3,871,179 A | 3/1975 | Bland | |
| 4,702,903 A | 10/1987 | Keefer | |
| 4,801,308 A | 1/1989 | Keefer | |

(Continued)

OTHER PUBLICATIONS

Stochl, Robert J., Potential Performance Improvement Using A Reacting Gas (Nitrogen Tetroxide) As The Working Fluid In A Closed Brayton Cycle (Dec. 1979), retrieved from https://ntrs.nasa.gov/api/citations/19800008230/downloads/19800008230.pdf.

*Primary Examiner* — Shafiq Mian
(74) *Attorney, Agent, or Firm* — Womble Bond Dickinson (US) LLP

(57) ABSTRACT

Engine systems and methods for performing a new chemical/thermodynamic cycle, termed a Chemo/thermodynamic Closed Combined (CCC) cycle, are proposed herein. The CCC cycle is composed of an Endothermic Chemo/thermodynamic Open cycle (En-C-O) and an Exothermic Chemo/thermodynamic Open cycle (Ex-C-O), which together complete the larger CCC cycle. CCC cycles may operate as a Combined Heat and Power (CHP) cycle. Since the En-C-O and the Ex-C-O cycles are able to operate independently of one another, they can be distanced from one another in time and/or space. To complete the larger CCC cycle, the En-C-O and Ex-C-O chemical working fluids are stored and/or transported between one another. An Exothermic Reactor Exhaust Compressor (EREC), for permitting otherwise-waste CCC heat to convert said chemical working fluids from liquid/frozen pressurized states into pressurized vapors and/or gases, is also proposed herein. Finally, various En-C-O and Ex-C-O cycles are proposed herein.

18 Claims, 13 Drawing Sheets

(56) References Cited

U.S. PATENT DOCUMENTS

| | | | |
|---|---|---|---|
| 4,816,121 A | 3/1989 | Keefer | |
| 4,968,329 A | 11/1990 | Keefer | |
| 5,082,473 A | 1/1992 | Keefer | |
| 5,096,469 A | 3/1992 | Keefer | |
| 5,256,172 A | 10/1993 | Keefer | |
| 6,051,050 A | 4/2000 | Keefer et al. | |
| 6,357,217 B1 | 3/2002 | Griffin | |
| 6,374,591 B1 * | 4/2002 | Johnson | F01K 23/10 60/785 |
| 7,028,481 B1 * | 4/2006 | Morrow | F02C 1/10 60/671 |
| 2011/0226447 A1 * | 9/2011 | Mieda | F28D 20/003 165/104.12 |
| 2014/0202147 A1 | 7/2014 | Woodsum | |
| 2022/0119328 A1 * | 4/2022 | Schroer | C01B 3/342 |

\* cited by examiner

BLAND/EWING CYCLES FOR CHP AND CC PROCESSES

CROSS-REFERENCE TO RELATED APPLICATIONS

This application claims the benefit of provisional patent application EFS ID 44712068, Application No. 63/298,174, filed 10 Jan. 2022 by the present inventor, which is incorporated by reference in its entirety.

PRIOR ART

This field is related to thermochemical and thermodynamic (chemo/thermodynamic) heat engine cycles based on U.S. Pat. No. 3,067,594, U.S. Pat. No. 3,225,538, and U.S. Pat. No. 3,871,179.

BACKGROUND

"Mechanical efficiency" is defined as a measure of the efficiency of a mechanism in transforming the physical power put into said mechanism into the physical power taken out of said mechanism. Chemo/thermodynamic heat engine cycles involve the use of molecular compression and/or molecular expansion to increase the mechanical efficiency of said heat engine cycles. The concept of chemo/thermodynamic heat engine cycles was invented and patented by Reginald B. Bland and Frederick J. Ewing as patented in part in U.S. Pat. No. 3,067,594 (for open cycle chemo/thermodynamic applications) and as patented in part in U.S. Pat. No. 3,225,538 (for closed cycle and semi-closed cycle chemo/thermodynamic applications). A later patent, U.S. Pat. No. 3,871,179, granted posthumously to Reginald B. Bland, applied the chemo/thermodynamic heat engine cycle concept to the classic Stirling cycle.

From U.S. Pat. No. 3,225,538, column 7, paragraph 3, line 27: "Reactions in which the number of moles of endothermic fluid is greater than that of the exothermic fluid are preferred because the amount of work obtainable from the endothermic fluid is directly proportional to the number of moles. Hence, it is desirable to have a large number [of] moles in the endothermic fluid for performing the work of the engine, and contrary-wise, it is desirable to minimize the number of moles in the exothermic fluid prior to compressing the exothermic fluid." In the instance Bland and Ewing used for demonstrating said chemo/thermodynamic cycles, the reversible reaction C6H12<=>C6H6+3H2 (1 mol of cyclohexane converted to or from 1 mol of benzene plus 3 moles of hydrogen) is used. The C6H12 is the exothermic fluid because it is formed with an exothermic liberation of chemically-produced heat, and the C6H6+H2 is the endothermic fluid because the exothermic fluid, in its transformation into the endothermic fluid, chemically absorbs the heat that is later liberated.

As first inventors of chemo/thermodynamic heat engine cycles, such heat engine cycles are referred to herein as Bland/Ewing (B/E) cycles. In the B/E cycle C6H12<=>C6H6+3H2 instance used in U.S. Pat. No. 3,225, 538, an application of the chemo/thermodynamic process was made, for descriptive purposes, to a standard Brayton cycle. This is clearly shown in U.S. Pat. No. 3,225,53 FIG. 3 (illustrating standard Pressure/Volume (PV) curves), and FIG. 4 (illustrating standard Temperature/Entropy (TS) curves), where a B/E-Brayton (B/E-B) heat engine cycle to a standard Brayton heat engine cycle.

This invention relates to improvements to methods and apparatus employing endothermic chemical reactions and reversible chemical reactions of the endothermic-exothermic type for transfer of heat and/or production of mechanical energy.

The underlying foundational invention takes the form of a heat transfer system in which an endothermic chemical reaction and an exothermic chemical reaction are separately utilized in various cycles for transferring heat from a region of higher temperature to a region of lower temperature. In one aspect, the heat transfer method or system of this foundational invention may be adapted to heat a space or a substance or it may be embodied as a refrigeration system. In another aspect, the heat transfer method may take the form of a method or system for the production of mechanical work. Said methods or systems may be cyclical, wherein a chemical substance/reactant endothermically reacts to form products, the products are expanded producing work and are then reacted to re-form the initial chemical substance/reactant (see U.S. Pat. No. 3,225,538, U.S. Pat. No. 3,871,179, and U.S. Patent (pending) #No. 17/746,848). Also it is contemplated that a chemical substance/reactant which will undergo an endothermic chemical reaction may be employed to do mechanical work in a method which does not involve converting the reaction products back to the initial chemical substance/reactant (see U.S. Pat. No. 3,067, 594.

Stated broadly, this foundational invention utilizes control of changes in enthalpy and concomitant entropy in substances undergoing reversible exothermic-endothermic chemical reactions and conversion of such changes in enthalpy and entropy to sensible energy, as for heating a space or for driving an engine. The energy changes, which are controlled and utilized according to this foundational invention, result at least in part from changes in the chemical composition of the substances involved. Thus, this foundational invention utilizes a different dimension for production and control of sensible energy. This different dimension of control, i.e., change of composition, is one which may be superimposed on the basic controls of temperature, pressure, volume, and changes of phase for deriving sensible energy.

The term "exothermic fluid" as used in this specification and in the claims, means a substance, consisting of one or more elements and/or compounds, in liquid and/or vapor phases, which is formed with liberation of heat (negative heat of reaction) as a result of an exothermic reaction. The term "endothermic fluid" means a substance consisting of one or more elements and/or compounds, in liquid and/or vapor phases, which is formed with absorption of heat (positive heat of reaction) as a result of an endothermic reaction. The exothermic fluid absorbs heat in being converted to an endothermic fluid in an endothermic reaction. The endothermic fluid liberates heat in being converted to an exothermic fluid in an exothermic reaction. The method of this foundational invention comprises passing an amount of a chemical substance which is adapted to under go an endothermic reaction of a reversible chemical reaction in an endothermic reaction chamber; subjecting the contents of the chamber to a constraint which will cause the rate of the endothermic reaction to exceed that of the reverse exothermic reaction of said reversible chemical reaction, with the result that a substantial amount of the exothermic fluid is converted to endothermic fluid, the endothermic fluid thereby acquiring an increase in enthalpy and entropy; and converting at least a substantial part of the energy content of the endothermic fluid to sensible energy, as, for example, for heating a space or for driving an engine. The foundational invention further includes a method in which the endothermic fluid, substantially exhausted of its energy, is passed in a cyclical system to an exothermic-reaction chamber wherein the endothermic fluid is converted back to said exothermic fluid, and subsequent return of the exothermic fluid to said endothermic reaction chamber.

There are a number of chemical substances which enter into an endothermic chemical reaction at one temperature level and into an exothermic chemical reaction at a lower temperature level, the magnitudes of the respective temperature levels being such as to enable their utilization in the practice of this invention. An example of chemical substances which undergo reversible endothermic-exothermic chemical reactions of the type herein contemplated is that of cyclohexane as and exothermic fluid on the one hand and benzene and hydrogen as an endothermic fluid on the other hand. Cyclohexane produces benzene and hydrogen according to an endothermic reaction involving the absorption of heat. The reverse of the endothermic reaction is an exothermic reaction in which one mole of benzene combines with three moles of hydrogen to form one mole of cyclohexane in an exothermic reaction wherein heat is liberated. Such reversible exothermic-endothermic chemical reaction is expressed by the equation $C_6H_{12}+Heat \Leftrightarrow C_6H_6+3H_2$. That is, read left to right, one mole of $C_6H_{12}$ will require an endothermic or heat-absorbing thermochemical reaction in order to generate one mole of $C_6H_6$ plus three moles of $H_2$. That is, heat will need to be added. Read right to left, one mole of $C_6H_6$ plus three moles of $H_2$ will require an exothermic or heat-releasing thermochemical reaction in order to generate one mole of $C_6H_{12}$. That is, heat will need to be removed. Also, the same amount of heat that was required to be added will be required to be released.

For the purposes of this analysis, all calculations will be carried out using the $C_6H_{12}+Heat \Leftrightarrow C_6H_6+3H_2$ reactions. However, U.S. Pat. No. 3,225,538, names many other reactions which are suitable for the practice of this invention, and therefore this invention should not be considered limited to only $C_6H_{12}+Heat \Leftrightarrow C_6H_6+3H_2$ reactions.

SUMMARY

In several new embodiments of the foundational B/E Cycle, Combined Heat and Power (CHP) and Combined Cycle (CC) processes are proposed.

Cogeneration or combined heat and power (CHP) is the use of a heat engine or power station to generate electricity and useful heat at the same time.

A combined cycle power plant is an assembly of heat engines that work in tandem from the same source of heat, converting it into mechanical energy.

These new embodiments include:
1. The Bland/Ewing Low temperature Simple half-cycle (B/E-LS);
2. The Bland/Ewing Low temperature Complex half-cycle (B/E-LC);
3. The Bland/Ewing CHP Low temperature Complex cycle (B/E-CHP-LC);
4. The Bland/Ewing CHP High temperature Complex cycle (B/E-CHP-HC);
5. The Bland/Ewing CC Low temperature Complex cycle #1 (B/E-CC-LC-1);
6. The Bland/Ewing CC High temperature Complex cycle #1 (B/E-CC-HC-1);
7. The Bland/Ewing CC Low temperature Complex cycle #2 (B/E-CC-LC-2);
8. The Bland/Ewing CC High temperature Complex cycle #2 (B/E-CC-HC-2).

BRIEF DESCRIPTION OF THE DRAWINGS

The invention will be illustrated in greater detail by description in connection with specific examples of the practice of it and by reference to the accompanying drawing, in which:

FIG. 2 is based on a 1 lb (0.454 kg) "chemically correct" mixture of air, octane fuel ($C_8H_{18}$), and "an average amount of clearance gas", and was designed to be used with internal combustion gasoline engines. However, since the chart generally integrates a gas's states in relation to one another, it enables a relatively simple 1st order theoretical heat engine model to be constructed. In addition, an Ideal Gas Law calculator, referred to as "the ideal gas calculator", has been used, as will be seen.

Figure 2:
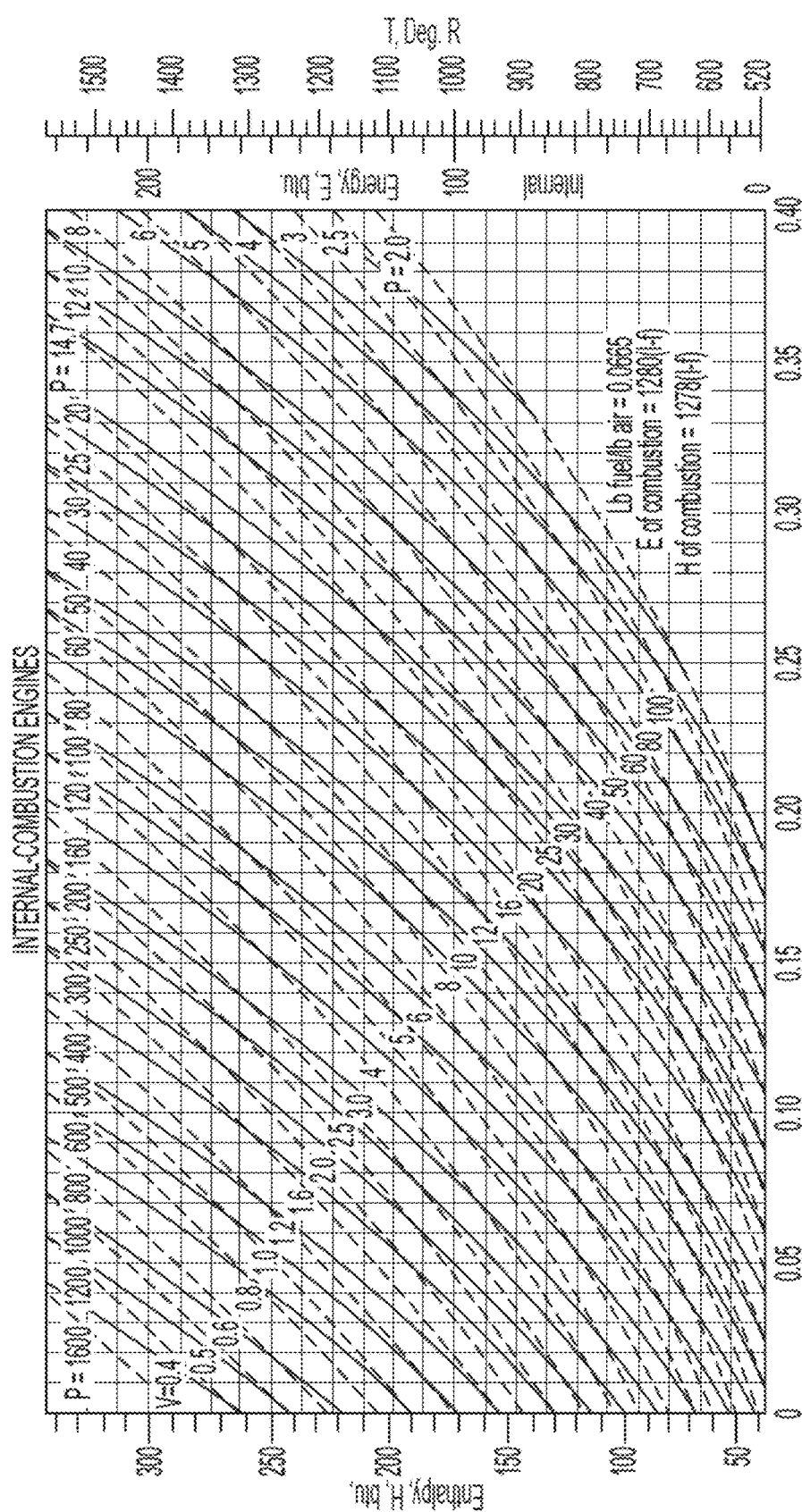
FIG. 2 is a pressure/volume/temperature/internal energy/enthalpy/entropy chart copied from "Marks 'Mechanical Engineers' Handbook", 1st edition, 9-148, "Internal-combustion engines", FIG. 70.

To aid in calculations, at various points the gaseous fuel/air states in FIG. 2 will be used to estimate similar states in $H_2$, $C_6H_6$. and/or $C_6H_{12}$ gas/vapor mixes. Since the mass will often be different, the usefulness will generally be in estimating temperatures at the end points of various constant pressure and constant entropy lines. For example, $C_6H_6$ boils at 1 atm and 353.2 K. Increasing the temperature of $C_6H_6$ to 428 K will completely convert $C_6H_6$ liquid into vapor. Per FIG. 2, at 14.7 psi (1 atm) and 770° R (428 K), the volume roughly equals 20 cu ft (566 L). Per the ideal gas calculator, at that temperature and pressure, 566 L equals about 16.1 mols of $H_2$ (note that the $H_2$ mass is drastically less than the fuel/air mix in FIG. 2). If 1 out of 4 molecules of $H_2$ is now replaced with a molecule of $C_6H_6$ at the same temperature and pressure, per Dalton's Law, temperature, pressure, and volume would remain approximately unchanged.

Note that the proposed B/E Cycle engine's working fluid is chemically changed halfway through a complete cycle. That is, at 100% conversion, the chemically expanded mol count ideally equals 4× the chemically compressed mol count. The comparative volumes and enthalpies can be easily adjusted at those points in FIG. 2. That is, the chart's chemically expanded (i.e. combined $C_6H_6$ and $3H_2$) vapor/gas volumes roughly equate to what is shown in the Marks' chart, while the chemically compressed (i.e. $C_6H_{12}$) vapor/gas volumes and heat requirement would need to be divided by the amount of molecular compression.

It was important to keep the cycle elements roughly within the chart's shown boundaries. Thus, for this initial analysis, an endothermic reaction to 90% completion, a maximum endothermic reaction pressure of 5.1 atm (75 psi), and a maximum endothermic temperature of 950 K (1,710° R) is used. Exothermic temperatures and pressures are different in different options, and unless stated the exothermic reaction is assumed to go to 100% completion.

Figure 3:
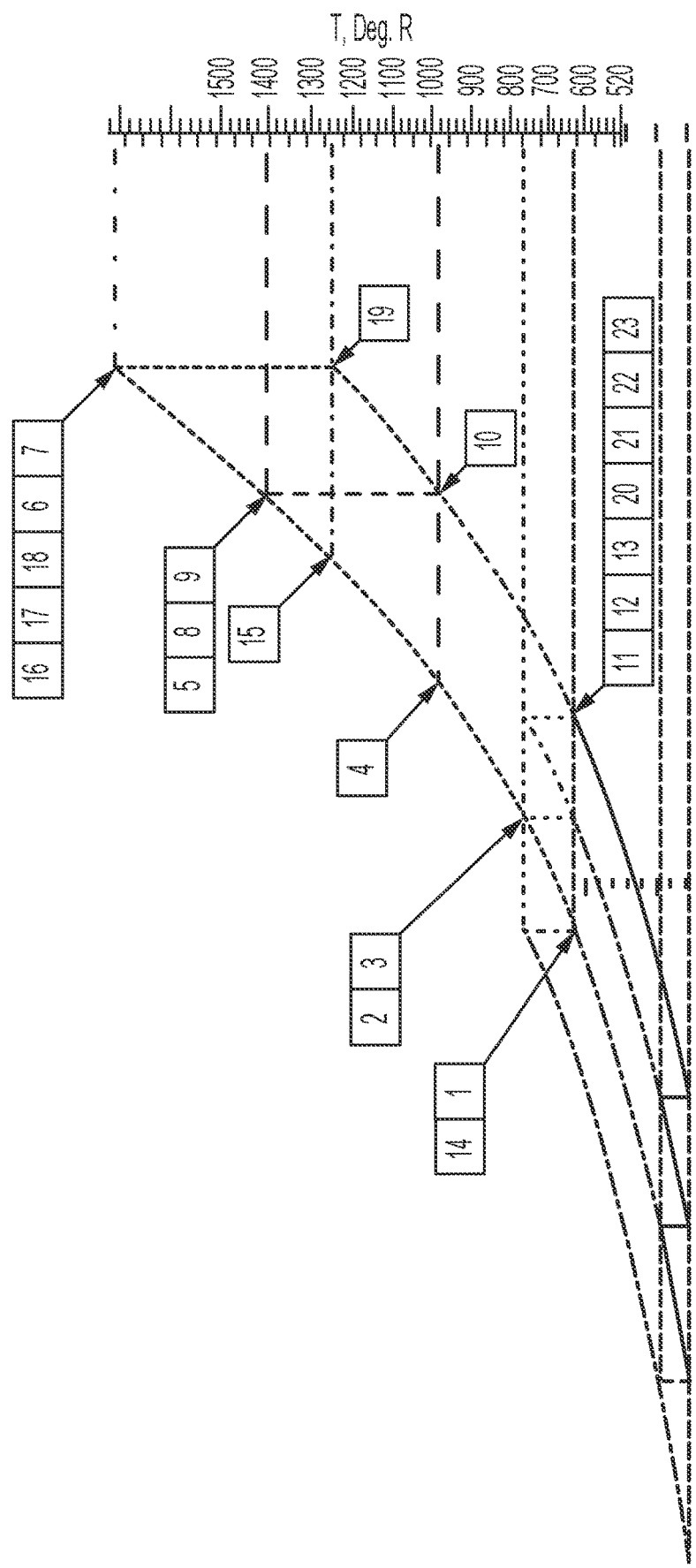
Figure 4:
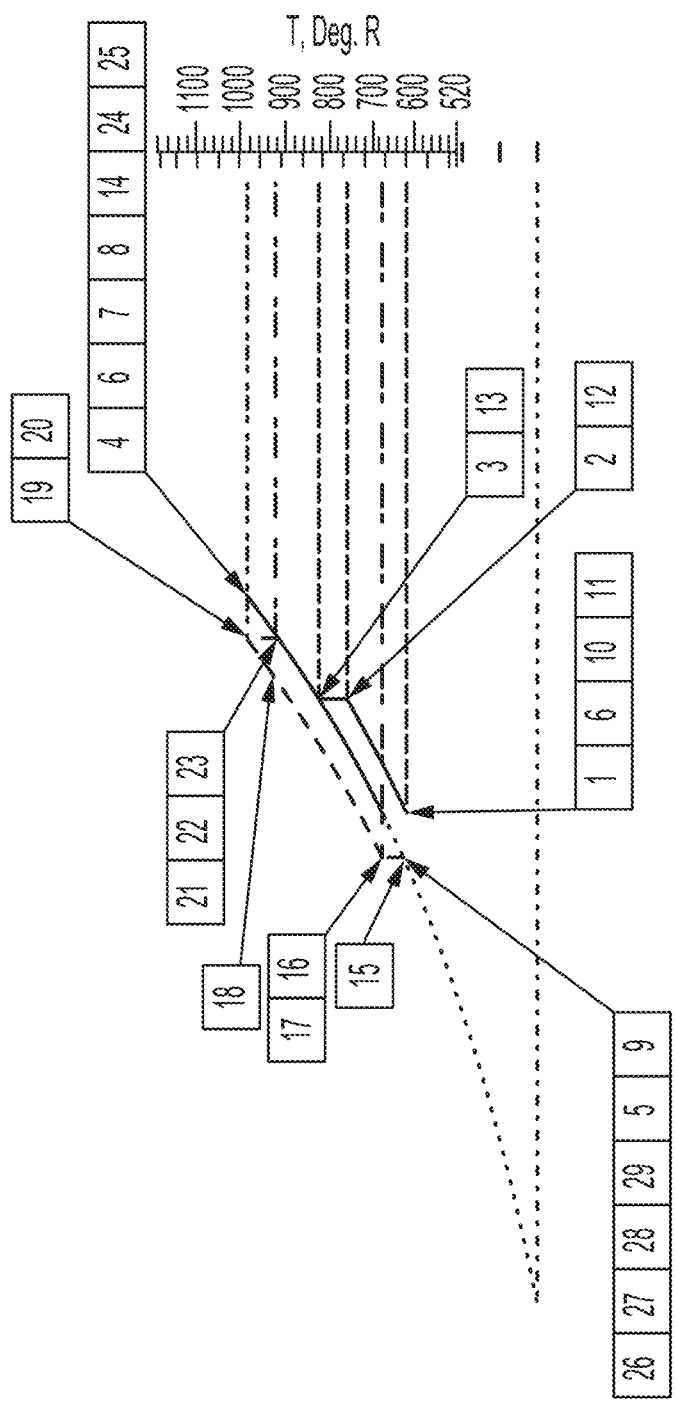
Figure 5:
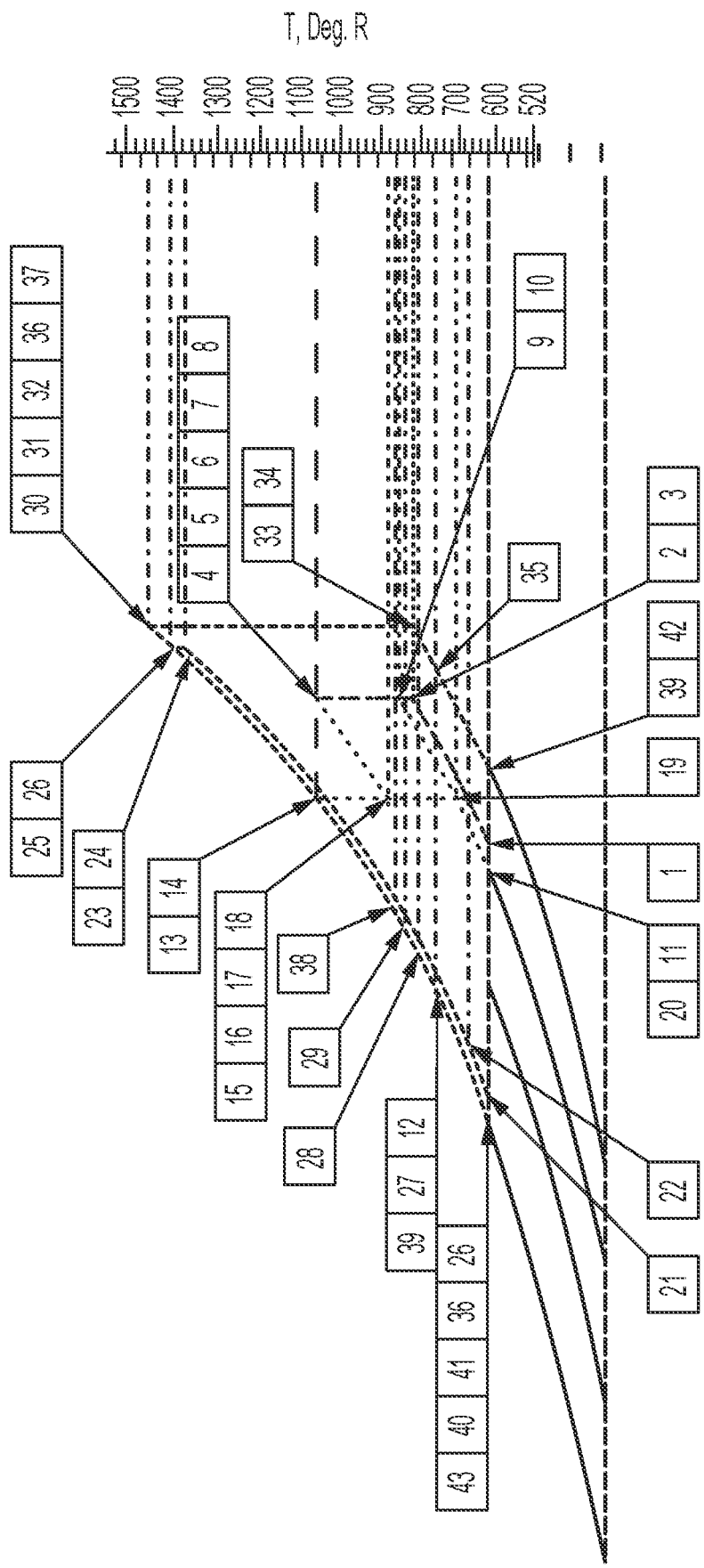

FIGS. 3, 4, and 5 are work diagrams illustrating possible approaches to constructing B/E-CHP and B/E-CC cycles. Note that FIGS. 3 through 5 are essentially traced over FIG.

2. For ease of discussion, the complete cycle is broken into an endothermic half-cycle or segment (FIG. 3) and an exothermic half-cycle or segment (FIGS. 4 and 5), and each segment is broken into variants and sub-variants. A complete B/E-CHP or B/E-CC cycle is a composite of at least one of each of these two half-cycles or segments. FIG. 3 also illustrates a "low temperature" endothermic segment and a "high temperature" endothermic segment, with the low temperature segment denoted by numbers 1 through 13, and the high temperature segment denoted by numbers 14 through 23. FIG. 4 and FIG. 5 likewise represent multiple half-cycles in each figure. Care must be taken to match the various numbered steps to the numbered points in the cycle being in these figures.

Figure 6:
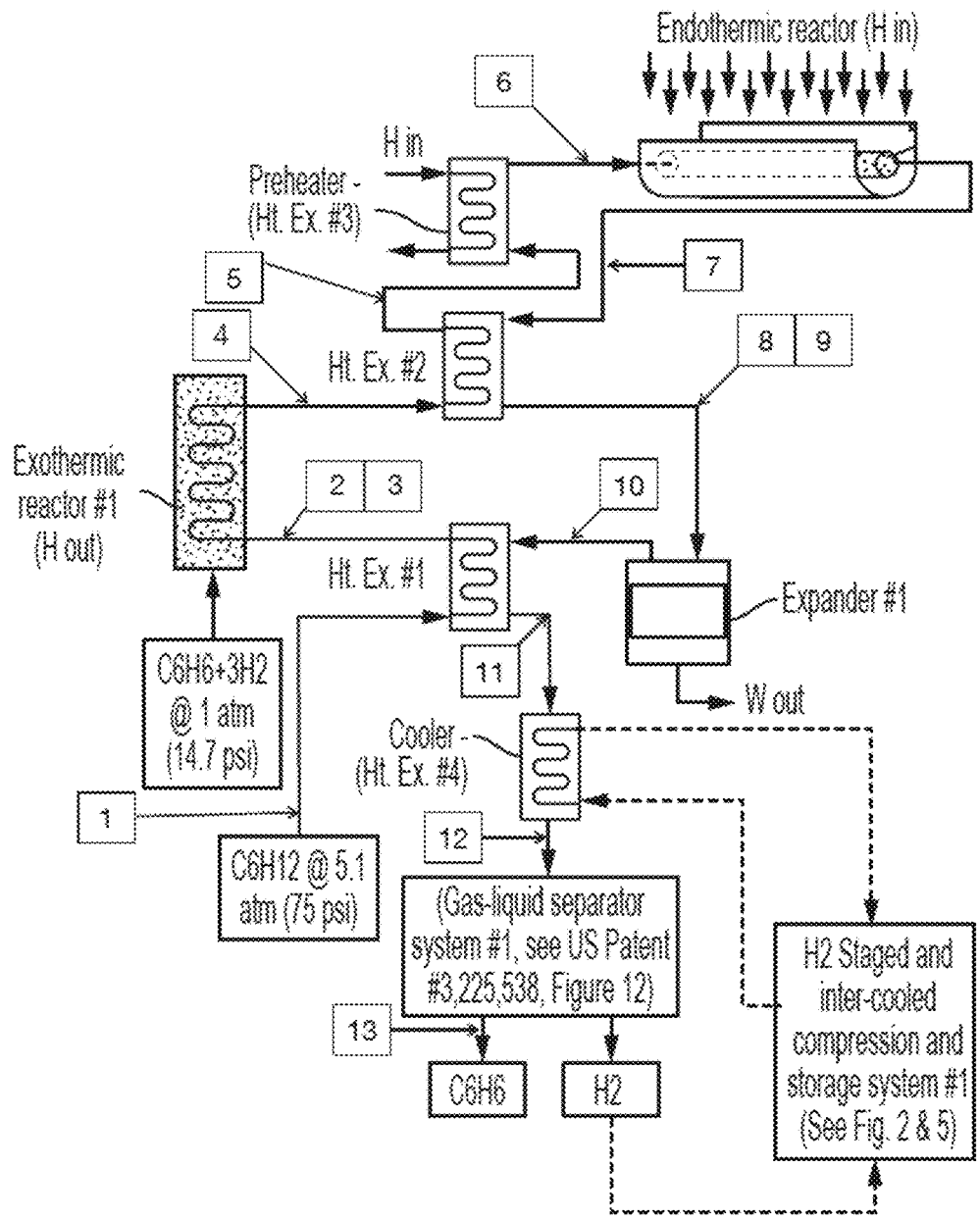
Figure 7:
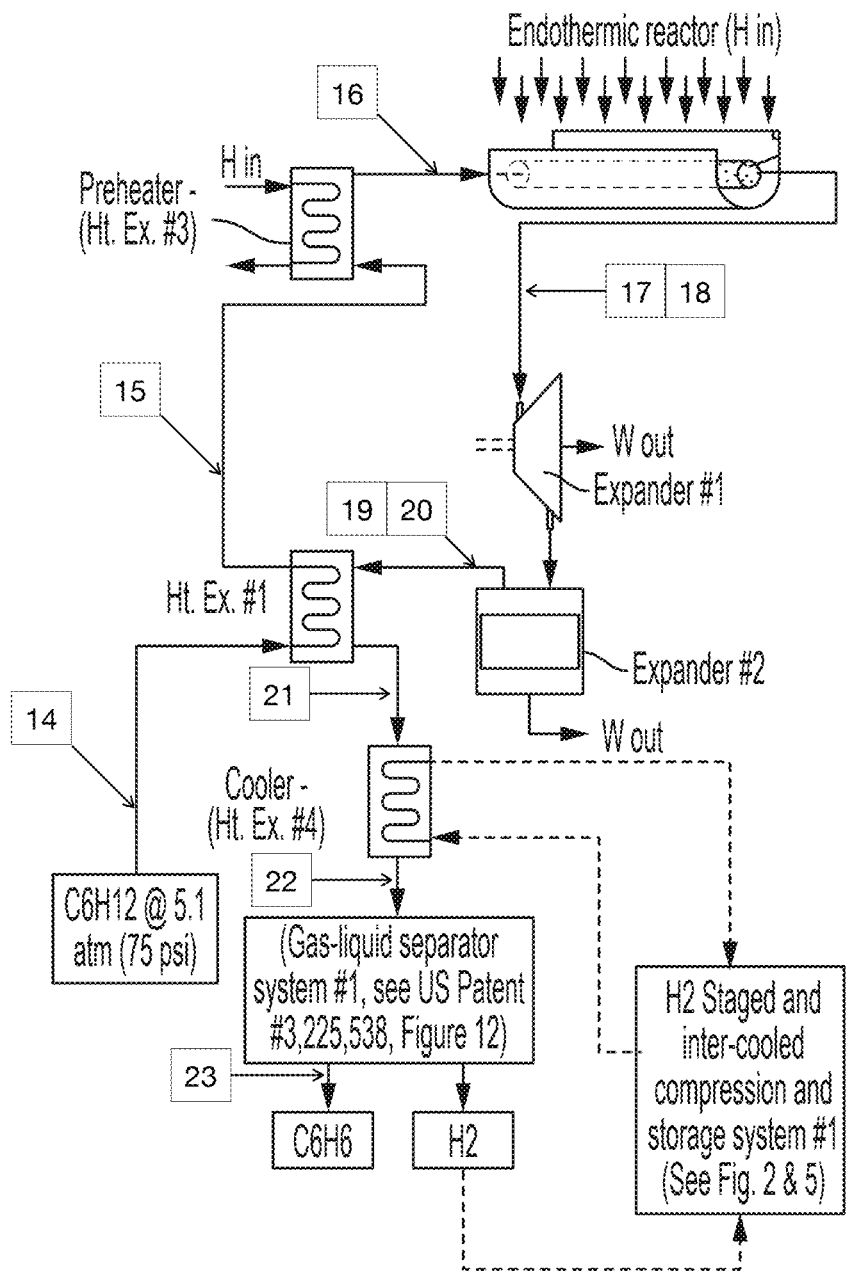

FIGS. 6 and 7 are schematic drawings of the main elements of the endothermic segment and its variants. FIG. 6 is illustrates a "low temperature" approach, and FIG. 7 illustrates a "high temperature" approach.

Figure 8:
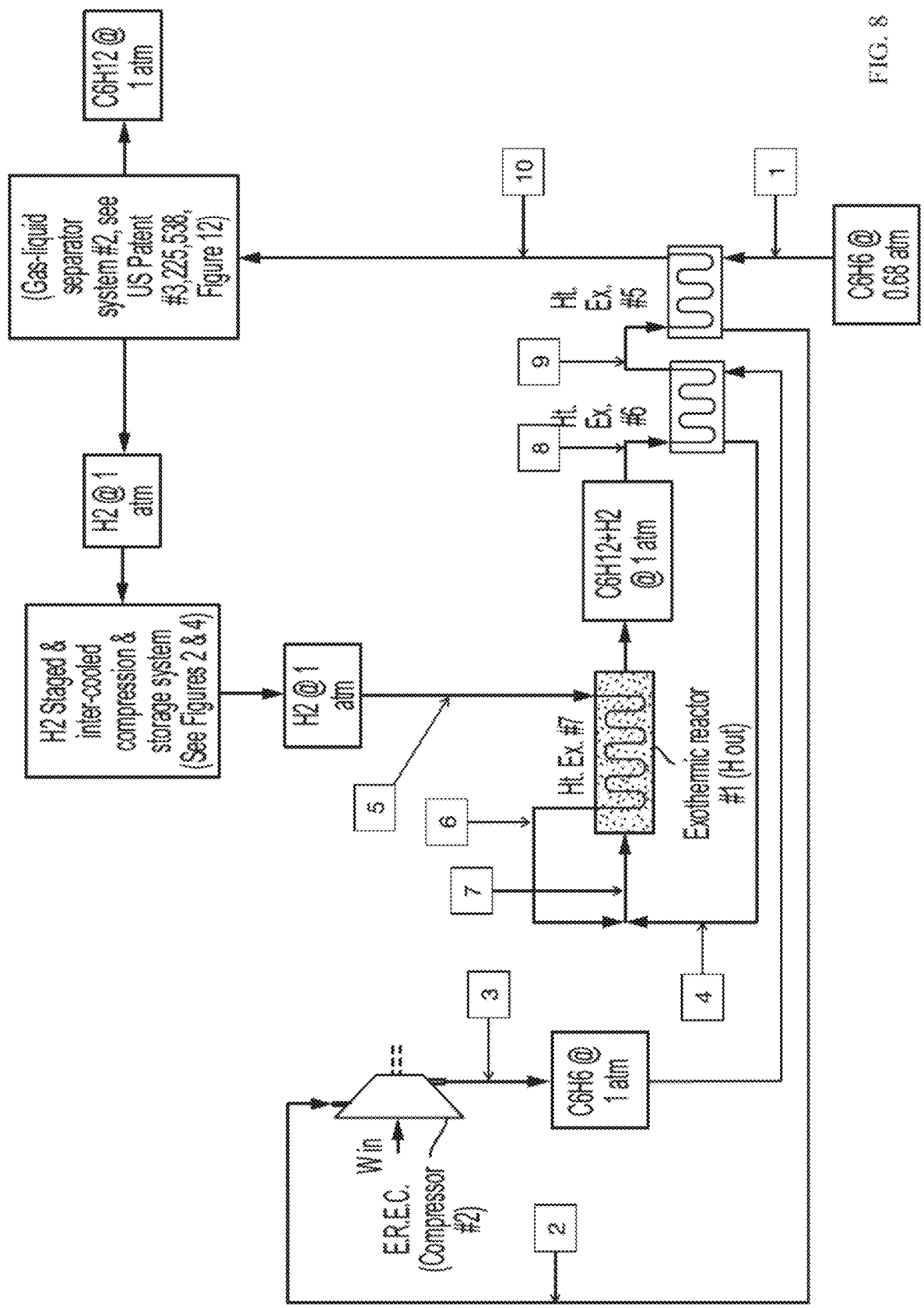
Figure 9:
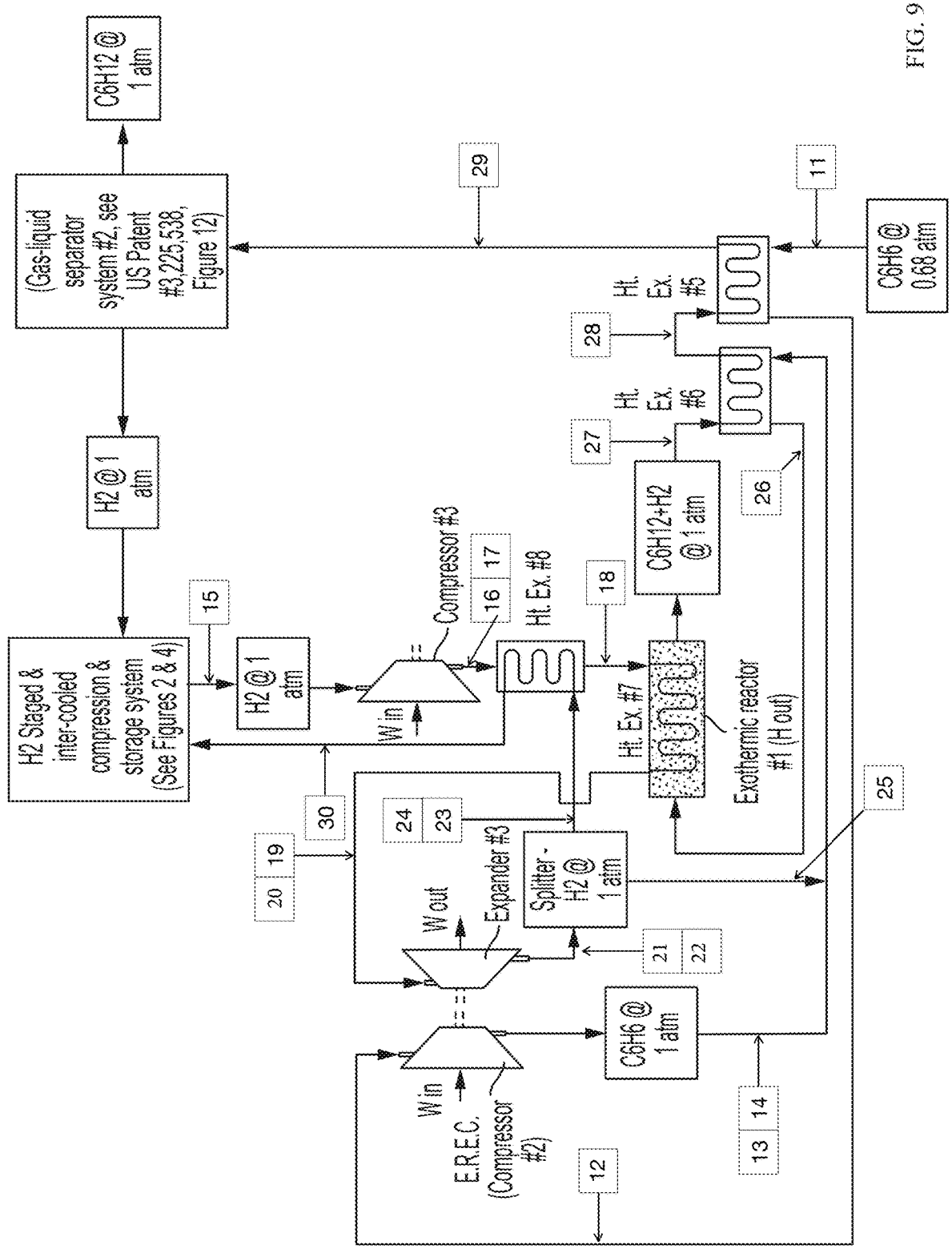

FIGS. 8 and 9 detail exothermic elements that accompany FIG. 6, and thus are essentially part of the "low temperature" endothermic segment. Note that the "high temperature" endothermic segment has no requirement to use the exothermic elements proposed for the "low temperature" endothermic segment.

Figure 10:
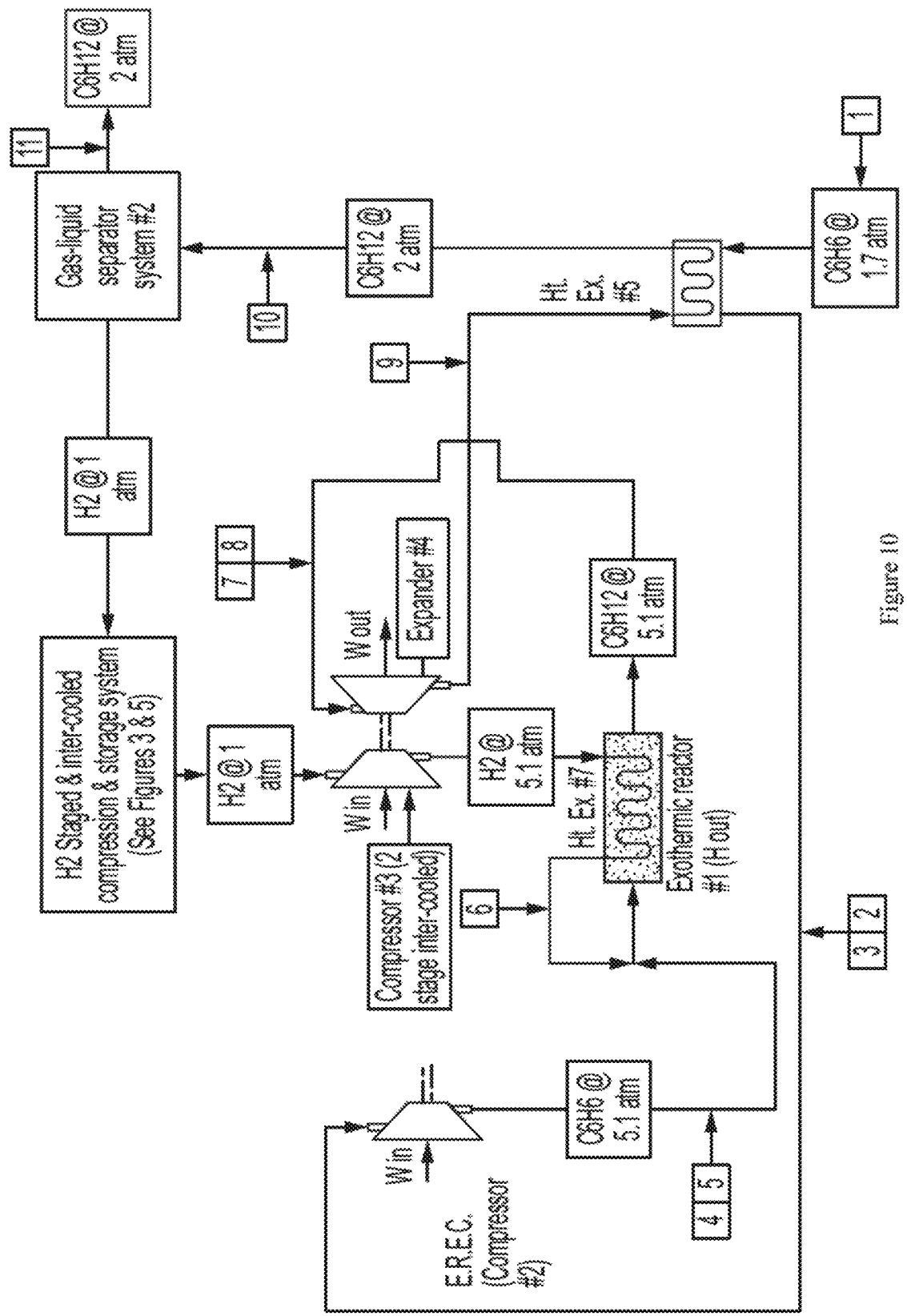
Figure 11:
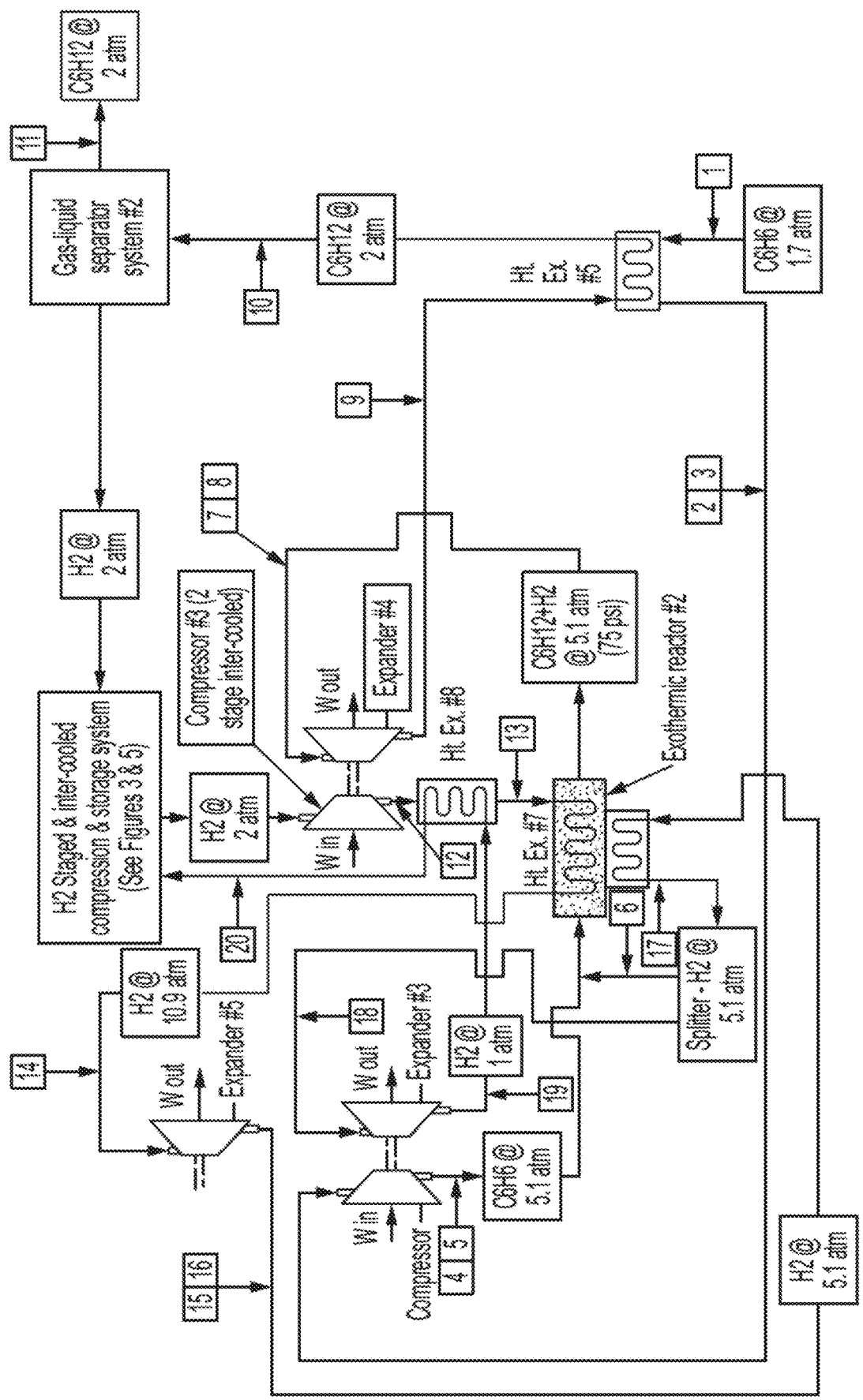
Figure 12:
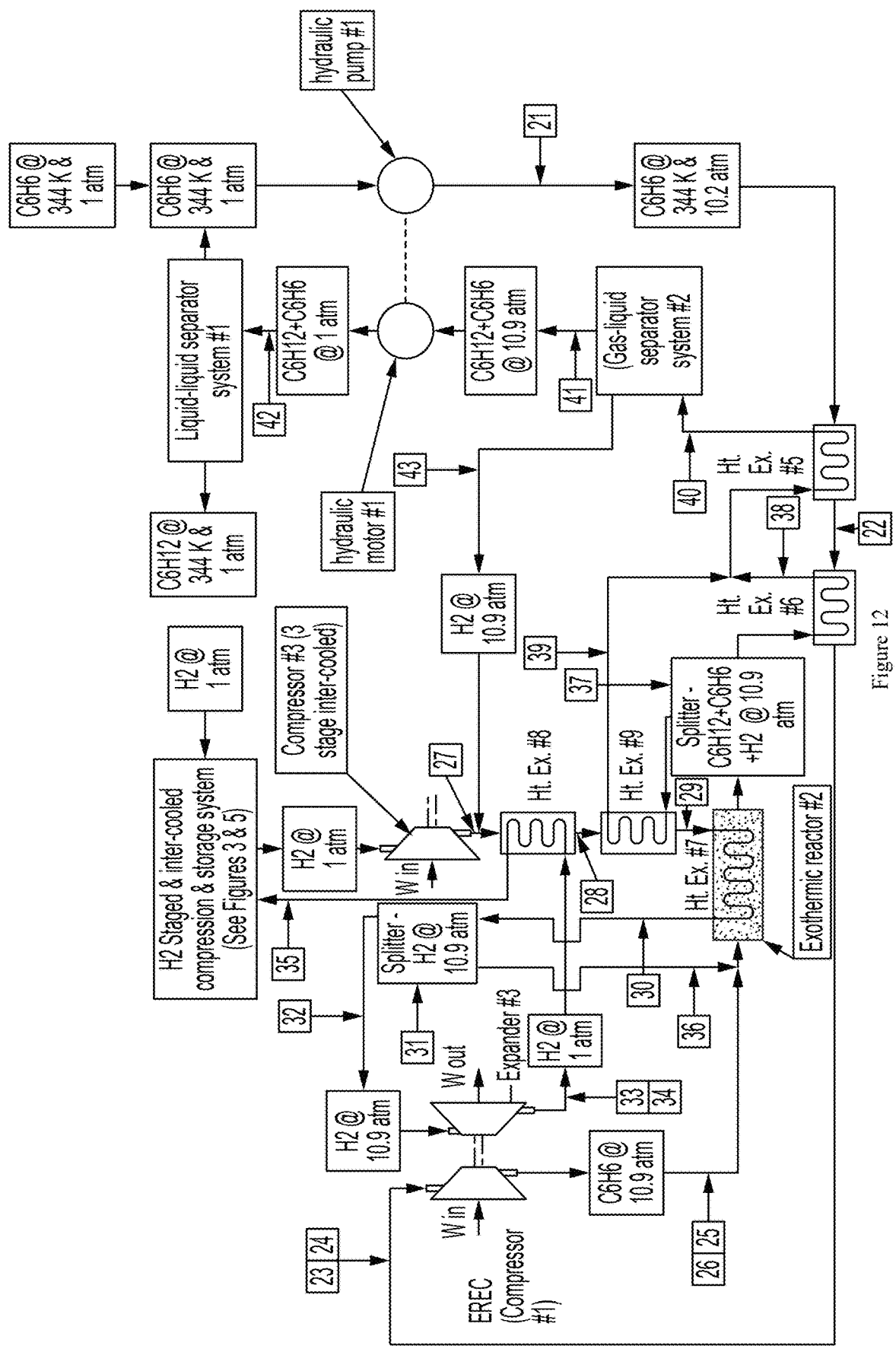

FIGS. 10, 11, and 12 are schematic drawings of the main elements of the exothermic segment and its variants. As noted above, a complete cycle is a composite of both relevant segments and their relevant schematics.

As will become clear, the endothermic and exothermic segments will not necessarily need to be in physical proximity to be fully functional. Indeed, the ability to physically separate the endothermic and exothermic segments is a major advantage of the proposed concepts.

Figure 13:
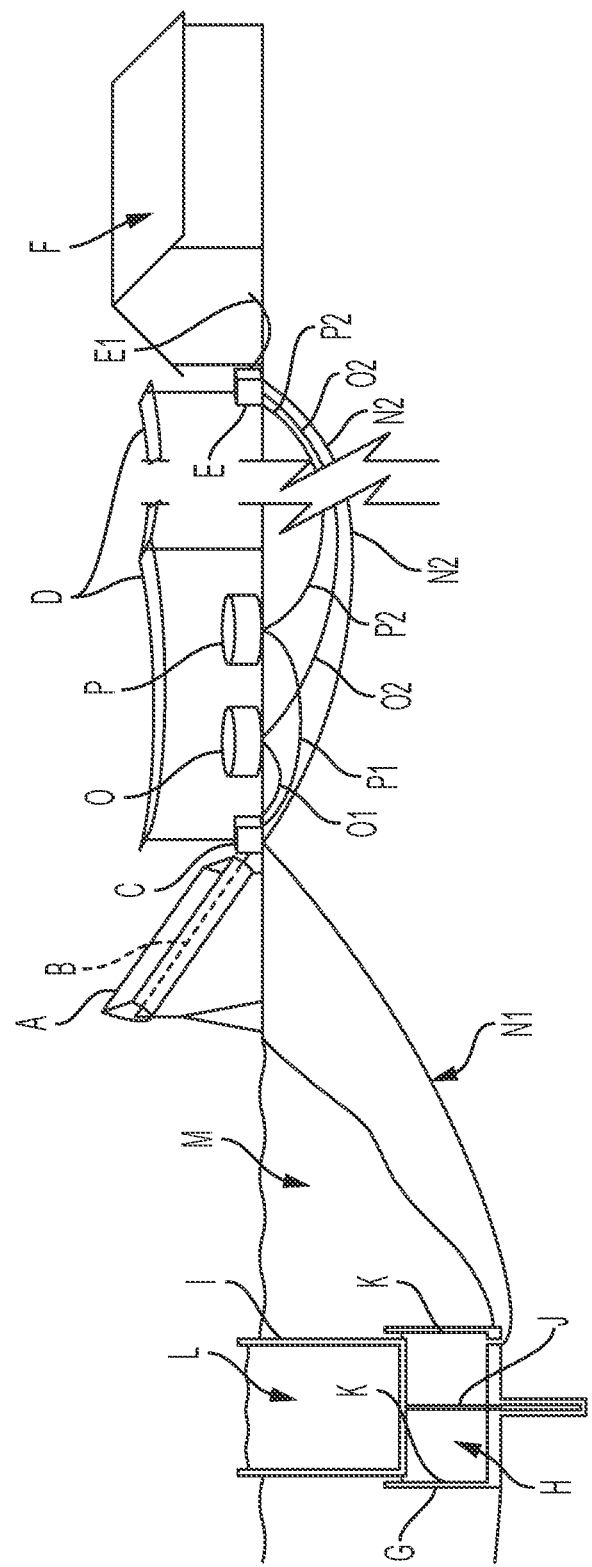

FIG. 13 illustrates one possible system for utilizing a B/E CHP/CC cycle for the purpose of "powering" an end user, either with motive force, thermal energy, or a combination of both types of energy.

Note: In many of the Figures, an "H2 Staged and inter-cooled compression and storage system" is shown. H2 is well known to be a very efficient heat transfer medium. In instances where H2 is already being stored, advantage of its presence can be taken to aid in efficient heat transfer, as between a hot fluid and a distant or disconnected cold source or a cold fluid and a distant and disconnected heat source.

Note that FIG. 6 represents one possible low temperature endothermic segment variant, and FIG. 7 represents one possible high temperature endothermic segment variant. Other approaches are possible for one skilled in the art. Also note that, in FIG. 7, Expander #1 represents a high temperature expander and is shown exhausting into Expander #2, which is a low temperature expander.

A legend for FIG. 13 is described as follows: A. Solar tracking trough concentrator. B. Solar concentrator target/endothermic reaction tube chamber. C. B/E CHP/CC endothermic segment mechanisms. D. Electrical transmission lines. E. Exothermic segment mechanisms. F. B/E CHP/CC end user. G. High pressure H2 storage tank. H. High pressure H2 gas. 1. Gravity-based pressure equalizing piston. J. Piston travel guide rod. K. Roll sock piston seal. L. Pressure-equalizing mass (shown as water). M. Ocean or lake (lake shown w/low reservoir level). N1. High pressure H2 delivery line between storage tank and endothermic segment mechanisms. N2. Low pressure H2 delivery line between endothermic segment mechanisms and end user. O. C6H6 liquid storage tank. O1. C6H6 liquid delivery line from B/E CHP/CC endothermic segment mechanism to C6H6 liquid storage tank. O2. C6H6 liquid delivery line from C6H6 liquid storage tank to end user. P. C6H12 liquid storage tank. P1. C6H12 liquid delivery line between B/E CHP/CC endothermic segment mechanism and C6H12 liquid storage tank. P2. C6H12 liquid delivery line from end user to C6H12 liquid storage tank.

One interesting application of the system detailed in FIG. 13 concerns the use of solar energy to power these new B/E cycles in proximity to a lunar PSR (Permanent Shadowed Region) near the Moon's poles. PSR's are areas on the lunar poles that are (1) in deep vacuum and (2) never see sunlight. They are generally depressions in the lunar surface at the Moon's poles, and may hold volatiles in the deep cold contained therein.

Since the same side of the Moon always faces the Earth. Earth's Moon rotates around its axis once per revolution relative to the sun, or approximately one revolution per month. As a result, many PSR's receive solar radiation on their rims for two weeks out of every month.

Assuming a solar thermal input was a reasonable distance from the depths of the PSR, for example 4 or 5 km, the exothermic fluid products could be produced during the limited period when solar energy is present and pumped through pipelines to the bottom of the PSR. Even though the PSR is at a substantially lower altitude, little net pumping work would be required for the liquid components flowing down as C6H6 and back up as C6H12, since the mass would be essentially the same in both directions. Only the difference in molecular mass and internal pipe friction would require work to overcome. Note that the H2 would only flow down its pipeline, since it will be returned within the C6H12 being pumped back up.

Importantly, the temperature of the product components, being in a natural vacuum, can likely be maintained to large degree as they traverse the distance. Thus, within the PSR, they can serve to give up useful latent heat to elements within the PSR. which may see temperatures as low as 100 K or lower. Note that H2 remains a gas at even these extreme temperatures.

Specific to the H2, if compression to higher pressure is made to occur within the PSR, then the heat generated by that compression can also be useful. That is. refraining from compressing the H2 at the endothermic reactor end could have a benefit within the PSR by making low quality thermal energy from compression available for other uses, such as melting water ice.)

Note that, as shown in FIG. 3, in a PSR, three stages of H2 compression could reach a H2 storage pressure and temperature of ~160 psi (10.9 atm) at ~150 K. The temperature difference per compression is estimated to be about about the same, or 79K. Thus, work in per compression would equal a total of 99 kJ.

Note also that high pressure super-cooled H2 recirculated out of and back into a PSR-based reservoir/heat exchange manifold can be used as a coolant for various processes, includinq coolinq heat exchanqer #4 and coolinq the H2 durinq the above-described inter-cooling stages.

Finally, note that, in a PSR, any remaining waste heat from a heat engine may still be useful, for example in processes such as maintaining temperature of equipment and releasing H20 vapor from lunar regolith.

DETAILED DESCRIPTION

The underlying improvement to the foundational B/E Cycle invention disclosed in U.S. Pat. No. 3,225,538, U.S. Pat. No. 3,067,594, and U.S. Pat. No. 3,871,179 takes the form of methods and apparatuses for combining various half-cycle endothermic and half-cycle exothermic portions of a complete B/E Cycle, said combinations depending on whether the requirement for said full cycle is to aid in generating stored thermal energy (as for CHP purposes) or to aid in generating work (as for CC purposes). To accomplish this, the B/E Cycle is broken into endothermic portions and exothermic portions, and the half-cyclical nature of each is designed to optimize for either CHP or CC output.

Endothermic Segment

In the endothermic segment, the products of the endothermic reaction or exothermic fluid are created from the reactant or endothermic fluid. The "low temp" (low temperature) endothermic half-cycle variant assumes a non-lubricated expander solution is required to avoid impacting the chemistry. One means of avoiding the use of lubrication is to moderate the expander input temperature with a high temperature counterflow heat exchanger between the endothermic reactor and the expander, permitting the use of teflon seals and a zero-to-moderately-cooled expander.

A "high temp" (high temperature) endothermic half-cycle variant assumes a high temp solution can be found to the issue of non-lubrication. It is obvious that other expander approaches may permit high temperature $C_6H_6$ and $H_2$ exhausting from the endothermic reactor to be expanded at the temperature of the endothermic reaction or higher. Those approaches may include novel forms of positive displacement equipment, rotary expanders such as reaction and impulse turbines, magnetohydrodynamic expanders, or some combination thereof.

Exothermic Segment

Various exothermic half-cycles will mate with the endothermic segment's low temp and high temp endothermic half cycle variants. These can be divided into two general variants; exothermic-for endothermic variants and exothermic production variants. Note that each exothermic variant itself contains sub-variants.

Exothermic-for-Endothermic Variants

Two alternative exothermic-for-endothermic half-cycles generate heat from a small fraction of the exothermic fluid product of the low temp endothermic variant and are purposed for direct use within the low temp endothermic variant. The first exothermic-for-endothermic half-cycle is a "simple" cycle, and the second is a "complex" cycle, as will be shown below. As mentioned earlier, in order to create a B/E Cycle, both an endothermic element and an exothermic element would be required. However, the exothermic-for-endothermic variants do not serve in that capacity. They are better viewed as essential parts of the endothermic half-cycles. Essentially, a small portion of the exothermic fluid exiting the endothermic element is proposed to be captured and used to assist the endothermic cycle. The remaining large portion of exothermic fluid would then be used to power a complete B/E CHP or CC cycle.

Exothermic Production Variants

Three exothermic production variants are proposed, one for creating a complete CHP cycle, and two for creating alternative complete CC cycles. Each simple or complex exothermic production variant can be further defined by its approach to combining with either a low or high temperature endothermic variant, as will be shown.

For the CHP cycle, the goal will be the generation of the maximum amount of total thermal energy delivered, while the two CC cycles will emphasize the production of the maximum amount of total work delivered. Note that, for all three cycles, the total work will be an accumulation of the work out from the endothermic half-cycle plus the work out from the exothermic production half-cycle.

Specification—Detailed Description—First Embodiment—B/E-LS Half-Cycles:

A low temperature endothermic half-cycle (FIGS. 3 and 6) and simple exothermic half-cycle (FIGS. 3 and 7) are combined in the B/E-LS cycle. As disclosed in U.S. Patent Pending No. 17/46,848, liquid $C_6H_{12}$ is pumped into the system, is preheated, and vaporized. Vaporization of $C_6H_{12}$ is primarily accomplished by using the heat of condensation of expanded exothermic fluid $C_6H_6$ plus the latent heat of its $H_2$ constituent. Additional vaporization heat is supplied by exothermic heat supplied by a small portion of the exhausted exothermic fluid being reconstituted back into $C_6H_{12}$.

In a CHP cycle, the primary goal is the generation of a maximum amount of stored and/or transported thermal energy from a given amount of thermal input. That thermal energy is captured in the large remaining portion of exhausted exothermic fluid. That large remaining portion of exothermic fluid may then be run through an exothermic half-cycle at some distant location and/or later time. The total system for generating this thermal energy is referred to as an "exothermic production variant". A summary of the thermal efficiencies and the heat source efficiencies under the described temperature, pressure, volume, and mass constraints of the B/E-LS cycle can be found under the heading "Thermal Analysis" below.

Note that a novel technique termed an EREC (Exothermic Reactor Exhaust Compressor) is described for use with all exothermic segments, as will be shown. An EREC is a small compressor that sets up a pressure differential between the endothermic fluid exiting the exothermic reactor and the exothermic fluid vaporous component exiting the exothermic liquid component vaporizer. By raising the pressure of vaporous $C_6H_6$ prior to raising its temperature to that required by the exothermic reactor, the reaction will yield the $C_6H_{12}$ endothermic fluid at a higher pressure than the (pumped in) $C_6H_6$ requiring vaporization. With a sufficient pressure differential, the temperature at which the endothermic fluid will condense can be raised above the temperature that the exothermic fluid requires for vaporization. As a result, a large portion of the required $C_6H_6$ exothermic fluid vaporization heat can be supplied by the condensing $C_6H_{12}$ endothermic fluid, greatly increasing the efficiency of the overall exothermic half-cycle.

Note that no power source for the EREC is shown in FIG. 8. The implication is that the B/E-LS cycle would yield some of its net energy to power the EREC, and that therefore the endothermic and exothermic systems would be close enough to one another for net work out to be shared. Of course, work out by the endothermic system could be transmitted, as by conversion into electricity, to the exothermic system, allowing the endothermic and exothermic systems to be far apart. However, the whole reason for the development of the B/E-LS cycle is to generate excess thermal energy for the specific use by the endothermic system. Accordingly, the exothermic-for-endothermic variants will always be in close proximity to the endothermic system.

Specification—Operation—First Embodiment—B/E-LS Half-Cycles:

Endothermic Half-Cycle (Low Temp, See FIG. 3 and FIG. 6):
9. 0.454 kg & 586.6 cm3 of liquid reactant ($C_6H_{12}$) at 344 K and 1 atm is pumped from storage and into the half-cycle at 5.1 atm. Atm and 344 K is essentially the beginning state of the $C_6H_{12}$ reactant and the ending state of the C6H6 liquid product in FIG. 3 and FIG. 6. The reactant liquid pump (not shown) intake would thus start at point 13 in FIG. 3 and end at point 1. The assumption is that point 13 equals stored liquid C6H12 at atm that has exited the Ex-C-O and been returned to the En-C-O. Thus, pump work should be considered an isothermal compression shown in FIG. 3 as a move from point 13 to point 1.

Figure 1:
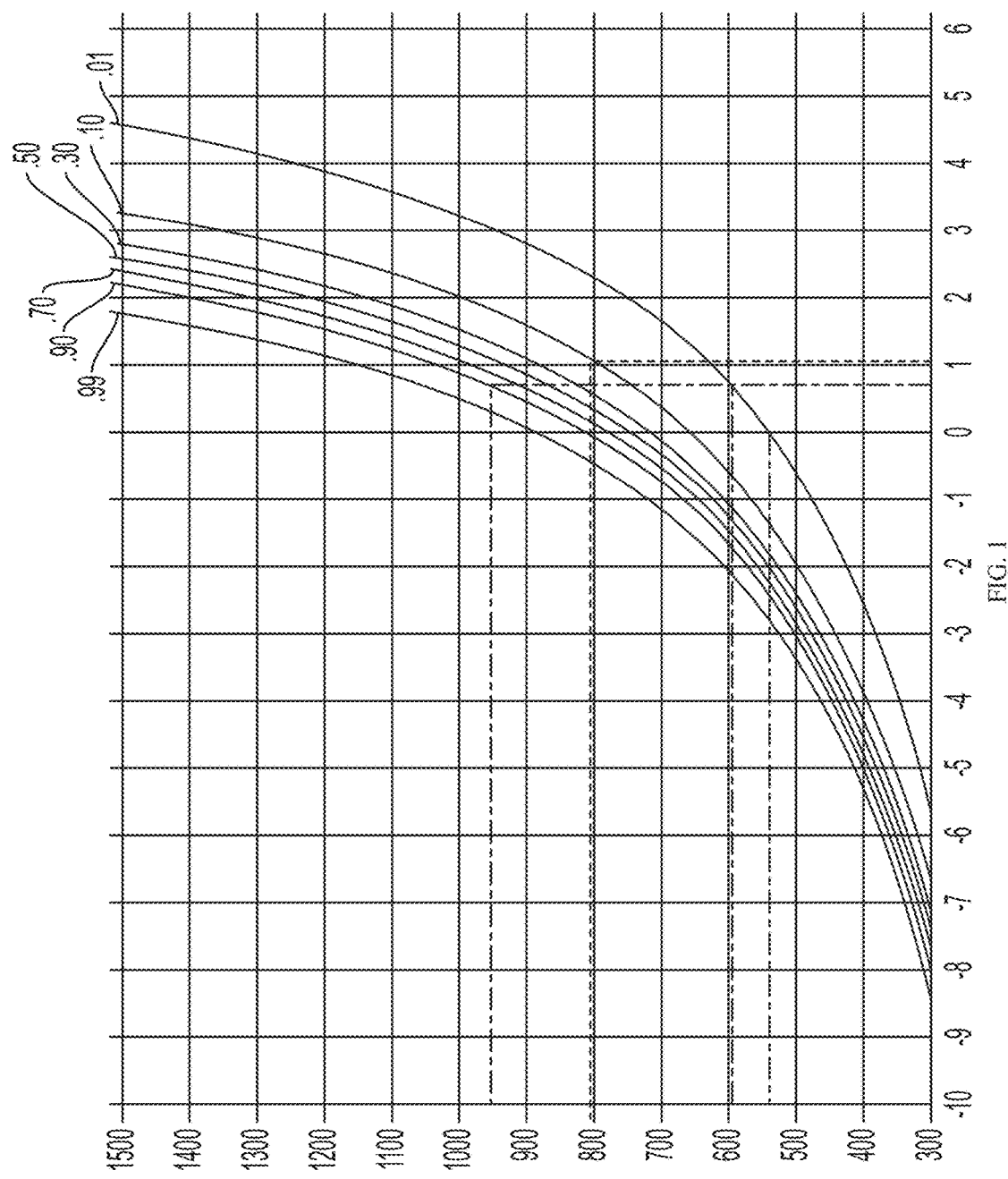
FIG. 1 is based on FIG. 1 in U.S. Pat. No. 3,225,538, which details a cyclical cyclohexane/benzene+hydrogen ($C_6H_{12} \Leftrightarrow C_6H_6+3H_2$) catalytic process, with temperatures in degrees Kelvin and pressure in atmospheres measured logarithmically to the base 10 (an insert graphs the base 10 into the righthand bottom of the figure).

10. The 0.454 kg of liquid reactant (C6H12) at 5.1 atm and 344 K is raised at constant pressure in heat exchanger #1 to approximately 353 K by the heat of condensation in the vaporous product and then to the temperature of vapor-liquid equilibrium, estimated at 423 K (Source B), by using some of the vaporous and gaseous heat capacity in the product mix.
11. In counterflow heat exchanger #1, the reactant is partially vaporized at constant pressure with the potential heat capacity in the vapor and gas product exhausting from expander #1.
12. In the endothermic reactor #1 heat exchanger attached to exothermic reactor #1 (see "Exothermic segment—exothermic-for-endothermic" below), the reactant at 423 K and constant pressure is completely vaporized and raised to 544 K.
13. In counterflow heat exchanger #2, the reactant at 544 K is raised at constant pressure to 788 K with product exiting the endothermic reactor.
14. In the preheater (heat exchanger #3, the C6H12 is raised at constant pressure to 950 K.
15. The C6H12 at 5.1 atm is converted at constant pressure and temperature in the endothermic reactor to 10% C6H12 and 90% C6H6+3H2 at 950 K (see FIG. 1), absorbing heat thermochemically and storing potential heat energy equal to 1,062 kJ.
16. The 0.454 kg (19.94 mols) C6H6+3H2 and 10% remnant C6H12 product then passes through counterflow heat exchanger #2, where the 5.1 atm gas/vapor product (C6H6+3H2 and 10% remnant C6H12) is cooled at constant pressure to about 788 K by inflowing vaporized 5.1 atm C6H12 reactant at 544 K.
17. The product at 788 K and 5.1 atm is then exhausted from heat exchanger #2 into expander #1.
18. The converted working fluid is expanded adiabatically to about 544 K and 1 atm, creating work.
19. The adiabatically expanded working fluid is exhausted from the expander #1 at 1 atm and 544 K into counterflow heat exchanger #1, where it is used to help preheat liquid C6H12 at 5.1 atm.
20. The 1 atm product stream then flows through cooler (heat exchanger #41, where it is cooled back to 344 K (or lower).
21. The product is then separated into liquid and gaseous constituents, and the C6H12 is either stored, shipped, or recycled back from liquid storage to add to the new inflowing charge.

Exothermic Half-Cycle (Simple, See FIG. 4 and FIG. 8):

1. 0.038 kg of liquid C6H6 at 1 atm and 344 K is either pulled from storage or recycled from the endothermic or exothermic segment's 1 atm exhaust and injected into the endothermic segment's exothermic system at 0.68 atm.
2. The 0.038 kg or (0.038/0.07811=) 0.44 mol of liquid C6H6 at 0.68 atm flows into counterflow heat exchanger #5, where it is preheated to 353 K and vaporized and superheated to 422 K by exchanging heat with (0.038+0.0029=) 0.041 kg of C6H12 exhausting from heat exchanger #6 at 1 atm and 544 K.
3. The C6H6 vapor is compressed to 1 atm and 456 K within the Exothermic Reactor Exhaust Compressor (EREC) (compressor #2), which is powered by the endothermic segment's expander #1.
4. Following compression, the 0.038 kg of vaporous C6H6 at 1 atm and 456 K flows into counterflow heat exchanger #6, where it is preheated to 544 K by exchanging heat with 0.041 kg of C6H12 exhausting at 1 atm and 544 K from exothermic reactor #1 (see calculations below).
5. 0.0029 kg of H2 at 344 K (in the case of a PSR, storage temperature could approach 150 K) and 1 atm is injected into the half-cycle.
6. The temperature of the 0.0029 kg of H2 is then raised at constant pressure to 544K by partial external cooling of the exothermic reactor in heat exchanger #7.
7. The 0.0029 kg of preheated H2 at 1 atm and 544 K is then mixed with the 0.038 kg of preheated, vaporized, and superheated C6H6 at 1 atm and 544 K.
8. The 0.038 kg of C6H6 and 0.0029 kg of H2 product is then passed through exothermic reactor #1 at constant pressure and temperature, which produces (90+8.3)=98.3 kJ at 544 K plus 0.041 kg of C6H12 reactant.
9. The 0.041 C6H12 reactant at 1 atm exiting exothermic reactor #1 is then passed at constant pressure (1) through counterflow heat exchanger #6, thus superheating the inflowing C6H6 vapor, and (2) through counterflow heat exchanger #5, thus vaporizing the inflowing C6H6 liquid. Simultaneously, the C6H12 is cooled and condensed.
10. The 1 atm C6H12 (plus any excess H2) is then cooled, separated into liquid and gaseous constituents, and either stored, shipped, or recycled.

Specification—Detailed Description—Second Embodiment—B/E-LC Half-Cycle:

In the B/E-LC half-cycle, a low temperature endothermic half-cycle (FIGS. 3 and 6) and complex exothermic half-cycle (FIGS. 4 and 9) are combined. The use of the complex exothermic half-cycle rather than the simple exothermic half-cycle is the only difference between the first and second embodiments.

Recall that no power source for the EREC is shown in FIG. 8 implying that the B/E-LS half-cycle would supply some of its net energy to power the EREC. With the use of a complex exothermic half-cycle, the B/E-LC exothermic half-cycle is not so restricted, since expander #3 is powering both the EREC and Compressor #3. Essentially, the B/E-LC is a self-contained power plant that is also a CHP thermal energy generator. Note, however, that, as in the B/E-LS half-cycle, the whole reason for the development of the B/E-LC half-cycle is to generate excess thermal energy for use by the endothermic system. Accordingly, the exothermic system will always be in close proximity to the endothermic system.

Specification—Operation—Second Embodiment—B/E-LC Half-Cycles:

Endothermic Half-Cycle (Low Temp, Same as B/E-LS Half-Cycle):
Exothermic Half-Cycle (Complex, See FIG. 4 and FIG. 9):
(Note: An exothermic heat-powered H2 compressor (compressor #3) and expander (expander #3) engine system is added to the "exothermic-for-endothermic half-cycle—simple" variant to power the EREC.)

11. See B/E-LS Exothermic half-cycle, Step 1, above.
12. See B/E-LS Exothermic half-cycle, Step 2, above.
13. See B/E-LS Exothermic half-cycle, Step 3, above.
14. See B/E-LS Exothermic half-cycle, Step 4, above.
15. 0.0129 kg of H2 at 344 K and 1 atm is taken into compressor #3.
16. 0.0129 kg of H2 at 344 K is compressed by compressor #3 to 1.36 atm and 372 K.
17. 0.0129 kg of H2 at 372 K and 1.36 atm is exhausted from compressor #3 at constant pressure.
18. 0.0129 kg of H2 at 1.36 atm and 372 K absorbs heat from counterflow heat exchanger #8, raising the temperature of the 0.0129 kg of H2 to 511 K.
19. 0.0129 kg of H2 at 1.36 atm and 480 K absorbs heat from a heat exchanger attached to exothermic reactor #1, raising the temperature to 544 K.
20. 0.0129 kg of H2 at 1.36 atm and 544 K is taken into expander #3 at constant pressure.
21. 0.0129 kg of H2 is adiabatically expanded in expander #3 to 1 atm and 511 K, or a temperature difference of (544-511=) 33 K, producing (33×0.184=) 6.1 kJ. Per the ideal air calculator, volume would increase to 268 L.
22. 0.0129 kg of H2 is exhausted from expander #3 at 1 atm and 511 K.
23. 0.0129 kg of H2 (was 0.0029; see above) at 1 atm and 511 K is separated into two H2 streams of 0.0029 kg and (0.0129-0.0029=) 0.01 kg.
24. The 0.01 kg of H2 at 511 K and 1 atm is passed through heat exchanger #8, where it exchanges heat with the 0.0129 kg of H2 exhausting from compressor #3 at 372 K.
25. The 0.0029 kg H2 at 1 atm and 511 K is injected into the C6H6 stream at 1 atm and 456 K.
26. The 0.038 kg C6H6 and 0.0029 kg H2 mix are raised to 544 K in heat exchanger #6.
27. The 0.038 kg of C6H6 and 0.0029 kg of H2 at 1 atm and 544 K are then passed through through exothermic reactor #1, which produces 103 kJ at 544 K plus 0.041 kg of C6H12 reactant.
28. See B/E-LS Exothermic half-cycle, Step 9, above.
29. See B/E-LS Exothermic half-cycle, Step 10, above.
30. (Not shown) The 0.01 kg and (0.1/0.00202=) 4.95 mols of H2 at 1 atm and 372 K are passed through a cooler where it is cooled to 344 K and either returned to storage or recycled back into the engine.

Specification—Detailed Description—Third Embodiment—B/E-CHP-LC:

In the B/E-CHP-LC cycle, a low temperature endothermic half-cycle (FIGS. 3 and 6) and complex exothermic half-cycle (FIGS. 5 and 10) are combined. This creates the first of the three exothermic production cycles mentioned above.

In the exothermic production segment, the emphasis is on generating heat recreated by recombining all of the product, not just a small fraction for use in the endothermic segment. In the exothermic-for-endothermic half-cycles above, the exothermic reaction pressure/temperature occurred at atmospheric pressure. However, there is no reason the exothermic reaction pressure/temperature cannot be increased. In this segment, the impact of higher exothermic reactor pressures/temperatures will be explored.

Note that the question of heat quality (temperature of exothermic generation) is also important. Thus, while one process has been detailed above for generating heat at about 544 K, it is possible to increase the temperature of the thermal output by increasing the pressure of the exothermic reaction. In the system below, the product pressure has been raised from 1 atm to 5.1 atm, increasing the exothermic reaction to 589 K. It is obvious that the process described below can be used to create even higher heat quality.

Having generated the thermochemical storage product, the question arises how best to store/transport it to where it's needed. The C6H6 component is not a problem, since it can be easily stored, pumped, or shipped as a liquid. However, H2 gas could have a volume issue. Where the distance is not too great, it can be pumped through a pipeline, of course. But the longer the pipeline, the larger the pumping loss, especially at lower pressure. Physically transporting lower pressure H2 long distances could be expensive, but might be made economical using extremely lightweight and streamlined high pressure H2 storage tanks and streamlined, lightweight, low horsepower tractors and trains.

In other words, transportation and storage would be more economical if the H2 were increased substantially in pressure, reducing the diameter of a pipeline or the volume/diameter of an H2 storage/shipment tank for a given amount of H2 throughput. FIG. 4 illustrates a process that proposes using some or all of the work output of the endothermic segment to compress H2 via a staged and inter-cooled compression process. In FIG. 4, the H2 exhausting from the endothermic process is shown being compressed in a 2 stage system and in a 3 stage system. The 2 stage system is shown exhausting at 5.1 atm, while the three stage system is shown exhausting at 160 psi (10.9 atm). (Note that these pressures are for illustration purposes only. The exact pressure used will depend on several variables.)

Specification—Operation—Third Embodiment—B/E-CHP-LC:

Endothermic Half-Cycle (Low Temp, Same as B/E-LS):
Exothermic Half-Cycle (See FIG. 5 and FIG. 10):
1. 0.343 kg C6H6 liquid product at 1 atm is pressurized to 1.7 atm.
2. 0.343 kg C6H6 liquid at 1.7 atm and 344 K is raised at constant pressure in counterflow heat exchanger #5 to approximately the temperature of vapor-liquid equilibrium, estimated at 372 K, and then to approximately 456 K to completely vaporize the C6H6.
3. The 0.343 kg C6H6 vapor at 456 K and 1.7 atm is taken into the EREC (compressor #2) at constant pressure.
4. 0.343 kg (4.39 mols) C6H6 vapor is adiabatically compressed to 5.1 atm and 589 K within the EREC (compressor #2).
5. The 0.343 kg C6H6 vapor at 589 K and 5.1 atm (51.7 N/cm2, 75 psi) is exhausted from the EREC (compressor #2) at constant pressure.
6. 0.027 kg (13.2 mols) of H2 at 1 atm is compressed to 5.1 atm and 428 K, is injected into the exothermic segment, then heated to 589 K by, for example, heat exchanger #7, which is attached to exothermic reactor #2.)
7. The C6H6 and H2 product (plus possible excess H2) is then run through exothermic reactor #2, which produces (1062-103=) 959 kJ at 589 K and outputs 0.372 kg of C6H12 reactant (plus any excess H2).
8. The 0.372 kg of C6H12 reactant at 5.1 atm and 589 K is taken into expander #4 at constant pressure.
9. The 0.372 kg of C6H12 steam at 589 K is expanded adiabatically to a pressure of 2 atm (20.3 N/cm2) and a temperature of 456 K.

10. The 0.372 kg of C6H12 is exhausted from expander #4 through heat exchanger #5 at 2 atm (20.3 N/cm2) and 456 K, exchanging heat with the inflowing C6H6 and dropping to about 344 K.
11. The 1.7 psi liquid C6H12 is then pumped back into storage.

Specification—Detailed Description—Fourth Embodiment—B/E-CHP-H

The fourth embodiment proposes a cycle that is using the high temp endothermic half-cycle (FIGS. 3 and 7) segment variant. As a result, the exothermic reactor #2 heat left available is more substantial, and equals 1,024 kJ, with a 23.4% remainder. Therefore, the actual amount of excess H2 needs to be increased to 0.37 kg, and engine net work output per lb of reactant originally converted would thus increase to 241 kJ.

Specification—Operation—Fourth Embodiment—B/E-CHP-H

Endothermic Half-Cycle (High Temp, See FIG. 3 and FIG. 7):
14. 0.454 kg & 586.6 cm3 of liquid reactant (C6H12) at 344 K and 1 atm is pumped from storage and into the cycle at 5.1 atm. It will be assumed that the C6H12 is stored as a liquid at 344 K.
15. The 0.454 kg of liquid reactant (C6H12) is raised to 648 K with product exhausting from expander #2 through heat exchanger #1.
16. In the preheater (heat exchanger #3), the C6H12 is raised at constant pressure to 950 K.
17. The C6H12 at 5.1 atm is converted in the endothermic reactor to the product (10% C6H12 and 90% C6H6+ 3H2 at 950 K), absorbing heat thermo-chemically and storing potential heat energy equal to 1,062 kJ.
18. The 5.1 atm of C6H6, H2, and remnant C6H12 product at 950 K is then exhausted from the endothermic reactor into high temperature expander #1 and low temperature expander #2 (calculated as a single expander volume below).
19. The product is expanded adiabatically in expander #1 from 950 K and 5.1 atm to 694 K and 1 atm.
20. The product is exhausted at constant pressure of 1 atm and 694 K.
21. The converted working fluid then passes through counterflow heat exchanger #1, where the 1 atm gas/vapor product (C6H6, H2, and remnant C6H12) will be cooled to about 344 K by inflowing vaporized 5.1 atm C6H12 reactant at 344 K.
22. The 1 atm product stream then flows through cooler (heat exchanger #41, where it is cooled back to 344 K (or lower).
23. The product is then separated into liquid and gaseous constituents, and the C6H12 is either stored, shipped, or recycled back to add to the new inflowing charge from liquid storage.

Exothermic half-cycle (same as B/E-LC):

Specification—Detailed Description—Fifth Embodiment

The intent in the B/E-CC cycles is to maximize the work output rather than the thermal output. This is accomplished by essentially using the B/E-CHP cycle to power what what might be called a "bottoming cycle" heat engine (called so because it typically makes use of the lower temperature exhaust product of the main heat engine, although the more general term "combined cycle" engine also applies, since there are multiple heat engines involved).

For calculation purposes of this specific example, a 100% conversion of C6H6+3H2 to C6H12 and 898 kJ of net exothermic reactor heat per pound of reactant are assumed, permitting exothermic reactor heat to be made available at 589 K and 5.1 atm. Any excess heat energy at 589 K may be used to power a heat engine, for example a stirling engine. In an alternative heat engine approach, which is the approach shown below, excess working fluid may be added to the product components, in some designs permitting the excess fluid to share components like compressors, expanders, and heat exchangers. Note, however, that the additional fluid must be "inert" to the thermochemical processes (that is, its presence will not negatively react with or impact the processes). One such inert working fluid is H2, since it is already part of the product. Note that it is possible to use this approach with a gas other than H2, such as He (helium).

As shown in FIGS. 5 and 11, the B/E-CC-LC-1 cycle uses multiple staged and intercooled H2 compressors to "densify" the H2 working fluid that is added to the endothermic fluid product/product mix stream. In one typical B/E-CC cycle with excess working fluid, the excess gaseous component is assumed to be H2 stored at 10.9 atm. Note that the pressure can be substantially higher, which can be advantageous to the efficient conversion of heat to work, as will be shown.

For a complete BIE-CC cycle, the excess H2 (or equivalent) working fluid is exhausted from the engine, recompressed, and recycled. As a result, net work out is a function of expansion work minus compressor work. Note that the engine can operate so long as it has a supply of stored product (C6H6 liquid and H2 gas).

It will be assumed that the excess working fluid equals about 10 times the H2 working fluid required to produce the excess 755 kJ, or about 0.3 kg of H2, equal to about 148.5 mols of additional H2 that can be raised from 344 K to 589 K. Following the preliminary analysis, the amount of heat input required for 0.3 kg will be calculated. The amount of excess H2 required to utilize the available exothermic heat may then be determined.

In the B/E-CC-LC-1 analysis (FIGS. 5 and 11), a two stage H2 compressor (compressor #3) and a two stage H2 expander are proposed (expander #3 & #5) in addition to the EREC (compressor #2) and the single stage C6H12 expander (expander #4), with peak pressure of 10.9 atm. The excess H2 and the H2 required for the exothermic reactor will be compressed simultaneously, raising the total amount of H2 compressed to 0.33 kg or 162 mols. The H2 from the first stage expander will exhaust at 5.1 atm, permitting the H2 for the exothermic reactor to be separated out. The H2 second stage expansion will exhaust at 2 atm and 400 K.

Note: In order to simplify the B/E-CC-LC-1 cycle, the added excess H2 is analyzed as a separate H2 heat engine. The B/E-CHP cycle is assumed to run in parallel, with the H2 component for the B/E-CHP cycle being separated out and added as described below. That is, in this version of a B/E-CC cycle, all the elements of the B/E-CHP cycle repeat themselves.

Specification—Operation—Fifth Embodiment—(B/E-CC-LC-1)

Endothermic Half-Cycle (Low Temp, Same as B/E-LS):
Exothermic Half-Cycle (Low Temp, See FIG. 5 and FIG. 11):

12. 0.33 kg of H2 at 344 K (in the case of a PSR, storage temperature could approach 150 K) and 2 atm is compressed to 10.9 atm and 422 K by, for example, two-staged and inter-cooled compressor #3 (if located at a distant exothermic segment) or #1 (if located at the endothermic segment). This combined process is shown in FIG. 11.
13. The 0.33 kg (162 mols) of H2 at 422 K, 10.9 atm, and 515 L is exhausted from compressor #3 at constant pressure and used to partially cool exothermic reactor #2, raising the temperature to 589 K.
14. The 0.33 kg of H2 at 10.9 atm and 589 K is taken into expander #5 at constant pressure.
15. The 0.33 kg of H2 is adiabatically expanded in expander #5 to 5.1 atm and 489 K, or a temperature difference of (589-489=) 100 K.
16. The 0.33 kg of H2 is exhausted from expander #5 at 5.1 atm and 489 K.
17. The 0.33 kg of H2 is separated into the 0.3 kg of excess H2 and the 0.03 kg of H2 to be passed into the "Exothermic production variants for B/E-CC Cycle" at approximately step 5.
18. The 0.3 kg of H2 is passed into expander #3 at 5.1 atm and 489 K.
19. The 0.3 kg of H2 is adiabatically expanded in expander #3 to about 2 atm and 389 K, or a temperature difference of (489-389=) 100 K.
20. The 0.3 kg of H2 is exhausted from expander #3 at 2 atm and 389 K, passed through heat exchanger #8 where it is partially cooled by the H2 exhausting from compressor #3. then passed throuqh a final cooler (not shown) and stored within the storage system ( (see step 12. above) at the temperature of said storage system.

Specification—Detailed Description—Sixth Embodiment

The sixth embodiment proposes a cycle that is using the high temp endothermic half-cycle (FIGS. 3 and 7) segment variant. As a result, the exothermic reactor #2 heat left available is more substantial, and equals 1,024 kJ, with a 23.4% remainder. Therefore, the actual amount of excess H2 needs to be increased to 0.37 kg, and engine net work output per lb of reactant originally converted would thus increase to 241 kJ.

Specification—Operation—Sixth Embodiment—(B/E-CC-H-1)

Endothermic Half-Cycle (High Temp, Same as B/E-CHP-H):
Exothermic Half-Cycle (High Temp, Same as B/E-CC-LC-1):

Specification—Detailed Description—Seventh Embodiment

The seventh embodiment, or B/E-CC-LS-2, adds a second approach towards achieving a higher exothermic half-cycle efficiency, in this case using the low temp endothermic half-cycle (FIGS. 3 and 6) segment variant. In this approach, a 90% exothermic conversion from C6H6+3H2 to a mix of C6H12 plus remnant C6H6 and H2 (exothermic mix) is purposefully generated. That 90% conversion, per FIG. 1, will allow a higher temperature exothermic reaction to be achieved. Thus, 863 kJ of exothermic reactor heat can be made available at 800 K and 10.9 atm from the conversion of 0.343 kg of C6H6 and 0.027 kg of H2. Note that, while this form of "inefficiency" appears detrimental at first glance, a means has been found to efficiently separate and recycle the unused C6H6 and H2. Thus, the inefficiency is an inefficiency of production, not of thermal conversion. Note that, for a heat engine, a higher peak temperature will increase overall thermal efficiency.

Due to the lower exothermic reactor heat available, it will be assumed that the excess working fluid equals about about 0.125 kg of H2, equal to about 62 mols of additional H2 that can be raised from 344 K to 589 K. The total H2 mass circulated will thus equal 0.152 kg. Following the preliminary analysis, the amount of heat input required for 0.152 kg H2 can be calculated. The amount of excess H2 required to utilize the available exothermic heat may then be determined and the net results recalculated.

In B/E-CC-LS-2, as in B/E-CC-LS-1, a pump is used to pressurize the C6H6 liquid, starting at 1 atm. However, the C6H6 is pumped to a much higher pressure, in this example to 10.2 atm. After vaporization of the C6H6 by raising the temperature via heat exchange to 780 K, an EREC is used to increase the pressure from 10.2 atm and 780 K to 10.9 atm and 800 K.

Specification—Operation—Seventh Embodiment—(B/E-CC-LC-2)

Endothermic Half-Cycle (Low Temp, Same as B/E-CC-LC-1):
Exothermic Half-Cycle (Low Temp, See FIG. 5 and FIG. 12):

21. 0.343 kg C6H6 liquid product at 344 K and 1 atm is pressurized via a liquid pump #1 to 10.2 atm.
22. The 0.343 kg of C6H6 liquid at 10.2 atm and 344 K is raised constant pressure in counterflow heat exchanger #5 to the temperature of vapor-liquid equilibrium, estimated at 465-475 K (see Source B), and partially vaporized. (Note: Source B indicates the vapor-liquid equilibrium for C6H12, which is assumed to approximately equal the vapor-liquid equilibrium for C6H6.)
23. 0.343 kg C6H6 liquid at 10.2 atm and 475 K continues to be raised at constant pressure in counterflow heat exchanger #5 to approximately 780 K.
24. 0.343 kg C6H6 liquid at 10.2 atm and 780 K is taken into the EREC (compressor #2) at constant pressure.
25. 0.343 kg (4.39 mols) C6H6 vapor is adiabatically compressed to 10.9 atm and 800 K within the EREC (compressor #2).
26. The 0.343 kg C6H6 vapor at 800 K and 10.9 atm (110 N/cm2, 75 psi) is exhausted from the EREC (compressor #2) at constant pressure (see number 36.).
27. 0.152 kg (75 mols) of H2 at 344 K (in the case of a PSR, storage temperature could approach 150 K) and 1 atm is compressed by multi-staged and inter-cooled compressor #1 (if located at the endothermic segment) or #3 (if located at a distant exothermic segment).
28. 0.152 kg (75 mols) of H2 at 428 K and 10.9 atm is raised to a temperature of 451 K by 0.125 kg (61.9 mols) of H2 at 456 K exhausting from expander #3.

29. 0.08 kg of exothermic mix exhausting from exothermic reactor #2 at 800 K is used to preheat, in heat exchanger #10, the 0.152 kg of H2 exhausting from heat exchanger #8 to 465 K.
30. The 0.152 kg of H2 at 10.9 atm and 465 K is used to partially cool exothermic reactor #2 in heat exchanger #7, raising the temperature to 800 K.
31. 0.152 kg (75 mols) of compressed and heated H2 at 10.9 atm and 800 K are separated into 0.027 kg (13.4 mols) and 0.125 kg (61.6 mols) of H2 (see number 36.).
32. The 0.125 kg of H2 at 10.9 atm and 800 K are taken into expander #3 at constant pressure.
33. The 0.125 kg (61.6 mols) of H2 at 10.9 atm and 800 K are expanded adiabatically in expander #3 to a pressure of 1 atm and 456 K.
34. The 0.125 kg (61.6 mols) of H2 at 1 atm and 456 K are exhausted at constant pressure from expander #3.
35. The 0.125 kg (61.6 mols) of H2 at 1 atm and 456 K is passed through heat exchanger #8, raising the 0.152 kg of H2 to 451 K and exhausting the 0.125 kg of H2 at 428 K, then passed through a final cooler (not shown) and stored within the storage system ((see number 12. above) at the temperature of said storage system.
36. The 0.343 kg of C6H6 and 0.027 kg of H2 product at 10.9 atm and 800 K are then mixed and passed through exothermic reactor #2 (see numbers 26. and 31. above).
37. The 0.372 kg of exothermic mix at 10.9 psi and 800 K is separated into two streams equal to 0.08 kg and 0.292 kg.
38. 0.292 kg of the exothermic mix at 10.9 atm and 800 K will be passed through heat exchanger #6, raising the temperature of the inflowing 0.343 kg of C6H6 at 10.2 atm from 475 K to 780 K and lowering the temperature of the exhausting 0.292 kg of exothermic mix to 480 K (see step 28 above).
39. 0.08 kg of the exothermic mix at 10.9 atm and 800 K will be passed through heat exchanger #9, raising the temperature of the inflowing 0.152 kg of H2 to 475 K and reducing the temperature of the exothermic mix to 428 K (see step 29 above).
40. The 0.08 kg of exothermic mix exiting heat exchanger #8 at 10.9 atm and 480 K and the 0.175 kg of exothermic mix exiting heat exchanger #6 at 10.9 atm and 480 K will be rejoined into 0.372 kg of exothermic mix and will be passed through heat exchanger #5, raising the temperature of the 0.343 kg of C6H6 liquid entering the system via liquid pump #1.
41. The 10.9 atm exothermic mix is passed through cooler/gas-liquid separator system #2 and is separated into a liquid C6H12 and C6H6 stream and a (0.003 kg) H2 stream at 344 K.
42. The liquid C6H12 and C6H6 stream at 10.9 atm passes through hydraulic motor #1 and drops to 1 atm, creating work that drives pump #1 and pressurizes the 0.343 kg of C6H6 entering the cycle to 10.2 atm (see step 21 above), and then passes through gas-liquid separates system #1 to be either recycled or go to storage.
43. The 0.003 kg of H2 at 10.9 atm and 344 K is injected back into the 0.152 kg H2 stream exhausting from multi-staged and intercooler compressor #3 (see step 27 above).

Specification—Detailed Description—Eighth Embodiment

As in the previous cycles, the B/E-CC-H-2 cycle utilizes the high temp endothermic half-cycle to boost overall thermal efficiency, thus creating the highest calculated potential thermal efficiency of all the cycles analyzed herein.

Specification—Operation—Eighth Embodiment—(B/E-CC-H-2)

Endothermic Half-Cycle (High Temp, Same as B/E-CC-H-1):
Exothermic Half-Cycle (High Temp, Same as B/E-CC-LC-2):
Specification—Thermal Analysis of Endothermic and Exothermic Segments
 TE=Thermal Efficiency
 TTE=Total Thermal Efficiency
 HE=Heat Source Efficiency
 THE=Total Heat Source Efficiency
Endothermic Segment
Low Temp Endothermic Half-Cycle (See FIG. 3 and FIG. 6)

$TE=(127/1148=)11.1\%$ $HE=((1062-90)/1148=)84.7\%$

High Temp Endothermic Half-Cycle (See FIG. 3 and FIG. 7)

$TE=(277/1230=)22.5\%$ $HE=(1062/1230=)86.3\%$

Exothermic Segment
Exothermic-for-Endothermic Variants
Simple Exothermic-for-Endothermic Half-Cycle (See FIG. 4 and FIG. 8)

Low temp+simple $TTE=((127-1.2)/1148=)11\%$ $THE=((1062-103)/1148=)84\%$

Complex Exothermic-for-Endothermic Half-Cycle—Complex (See FIG. 4 and FIG. 9)

Low temp+complex $TTE=(1271/1148=)11.1\%$ $THE=((1062-102)/1148=)83.6\%$

Exothermic Production Variants
Exothermic Production Variants for B/E-CHP Cycles (See FIG. 5 and FIG. 10)

Low temp+complex $TTE=((127-54)/1148=)6.4\%$ $THE=((1062-102-61)/1148=)78.5\%$

High temp+complex $TTE=((277-54)/1230=)18.1\%$ $THE=(1062-61/1230=)81.4\%$

Exothermic Production Variants for B/E-CC Cycles—Approach #1 (See FIG. 5 and FIG. 11)

Low temp+complex $TTE=((127+224-54)/1148=)25.9\%$

High temp+complex $TTE=((277+241)/1230=)42.1\%$

Exothermic Production Variants for B/E-CC Cycles—Approach #2 (See FIG. 5 and FIG. 12)

Low temp+complex

TTE=((176,9+262)/1148=)38.2%

High temp+complex

TTE=((326,9+282)/1333=)45.7%

Specification—Miscellaneous Descriptions and Operations

FIG. 13 illustrates one possible system for utilizing a B/E CHP/CC cycle. The following system elements describe the proposed system, as noted in the FIG. 13 legend:
- A. A solar tracking concentrator is used to concentrate energy to 950 K (677°, 1,250° F.).
- B. The concentrator hits a target of the trough concentrator which contains a catalytic material such as platinum. Molecules of a chemical such as $C_6H_{12}$ preheated to 950 K at 5.1 atm are converted within the endothermic reaction chamber, in this instance to $C_6H_6+3H_2$ and some remnant $C_6H_{12}$.
- C. The endothermic mix is passed into a series of mechanisms (object C), which output motive force, reduce the temperature of the endothermic mix, separate the constituent elements, in this case into $C_6H_{12}$, $C_6H_6$, and $H_2$, and send them either into storage containers or to the end user via, for example, (1) a low pressure delivery line for liquid $C_6H_6$ and (2) a low pressure delivery line for gaseous $H_2$.
- D. The motive force itself may be either stored as potential mechanical energy or is converted into electricity via a generator and sent either to an electrical storage system or to the end user for example, via electrical transmission lines (object D), such as make up the electrical grid.
- E. The exothermic segment mechanisms (object E) receive the liquid $C_6H_6$ (via delivery line O2), low pressure gaseous $H_2$ (via delivery line P2), and electrical energy (via delivery line D), producing additional motive force, $C_6H_{12}$, and thermal energy. Depending on the requirements of the end user, the output can be balanced to some degree between motive force and thermal energy.
- F. The motive force and thermal energy are then delivered to the end user, who returns the $C_6H_{12}$ at low pressure and temperature back to the power plant. In addition, the end user can deliver electricity generated by the motive force back to the power plant (via delivery line D).
- G. On the endothermic side, it will often be useful to have a storage tank for high pressure $H_2$ gas. One efficient method for storing and retrieving high pressure gas would be to store it in a reservoir capable of maintaining a constant pressure in the gas. Object G represents a cylinder in which a gas such as $H_2$ can be efficiently stored.
- H. Object H is a representative of a stored quantity of $H_2$ gas. 1. Object I represents a piston acting upon the $H_2$ gas. The piston is able to maintain a constant pressure within the cylinder (object G) by moving up or down as gas is withdrawn or added to the cylinder.
- J. Object J represents a piston rod which guides the piston such that it stays in alignment with the cylinder walls as the piston travels up and down.
- K. Object K represents a "roll sock" piston seal, which is a very low friction high seal approach that can completely separate the $H_2$ gas from any external elements.
- L. Object L represents a large mass, in this case water, which is held in a column on top of the piston (object I). The mass in this instance is suspended within a water medium, from which it is separated by a piston wall extension. The wall extension permits the external water, for example within a reservoir, to raise or lower with the season and still generally function to "bouy" the large mass (object I). If, for example, the $H_2$ pressure is equal to 10 atmospheres, or about 150 pounds per square inch, then 150 pounds of water would be added for every square inch of piston head area lifted 1 foot. Thus, when $H_2$ is added to the storage unit, 150 foot-pounds per square inch of work per lift of 1 foot is required to pump $H_2$ into the $H_2$ reservoir (object G), and 150 foot-pounds per drop of 1 foot is generated when the $H_2$ is pumped out.
- M. Object M represents an ocean or lake water medium in which the piston (object I) is suspended.
- N1. Object N1 represents the high pressure $H_2$ delivery line between energy source (object A) and the endothermic mechanisms (object C).
- N2. Object N2 represents the low pressure $H_2$ delivery line between the endothermic mechanisms (object C) and the end user.
- O. Object O represents the liquid $C_6H_6$ (low pressure) storage tank in the vicinity of the endothermic mechanisms.
- O1. Object O1 represents the liquid $C_6H_6$ (low pressure) delivery line between the endothermic mechanisms (object C) and the liquid $C_6H_6$ storage tank (object O).
- O2. Object O2 represents the liquid $C_6H_6$ (low pressure) delivery line between the endothermic mechanisms and/or the $C_6H_6$ storage tank and/or the end user.
- P. Object P represents the liquid $C_6H_{12}$ (low pressure) storage tank. Note that the $C_6H_{12}$ is shown in the vicinity of the endothermic mechanisms but could be placed at the end user site or in both locations.
- P1. Object P1 represents the liquid $C_6H_{12}$ (low pressure) delivery line between the endothermic mechanisms (object C) and the liquid $C_6H_{12}$ storage tank (object P).
- P2. Object P2 represents the liquid $C_6H_{12}$ (low pressure) delivery line between the end user and the $C_6H_6$ storage tank (object O) and/or the endothermic mechanisms (object C).

The invention claimed is:

1. A method for performing a closed thermochemical and thermodynamic (chemo/thermodynamic) work-producing cycle comprising two independent open chemo/thermodynamic work-producing cycles, the two open chemo/thermodynamic work-producing cycles comprising a first heat engine cycle that chemically or endothermically absorbs heat in a reactant such that said reactant is converted to a product mix, and a second heat engine cycle that chemically or exothermically releases heat from a product to create a reactant mix, the method comprising:
   a. increasing, from a first storage system, a first purified non-gaseous reactant to a set pressure;
   b. preheating, with a first heat source, said pressurized first non-gaseous reactant to its point of conversion to a pressurized first gaseous reactant;
   c. completely gasifying, with a second heat source, said preheated and pressurized first non-gaseous reactant to make said pressurized first gaseous reactant;
   d. preheating, with a fourth heat source, said pressurized first gaseous reactant to the temperature of an endothermic thermochemical reaction chamber;

e. passing said preheated and pressurized first gaseous reactant into said endothermic thermochemical reaction chamber;
f. stimulating, with a fourth heat source, said preheated and pressurized first gaseous reactant within said thermochemical reaction chamber to cause the preheated and pressurized first gaseous reactant to chemically absorb heat during a process of changing said preheated and pressurized mix first gaseous reactant into a first gaseous product mix;
g. expanding, with a first work-producing expander, said first gaseous product mix to a lower pressure and temperature;
h. cooling, with a first cooler, said expanded first gaseous product mix just prior to the point where said expanded first gaseous product mix separates into a second gaseous product mix and a first non-gaseous product mix;
i. cooling, with a second cooler, said first expanded gaseous product mix past the point where said first expanded gaseous product mix separates into said second gaseous product mix and said first non-gaseous product mix;
j. storing said second gaseous product mix and said first non-gaseous product mix in a second storage system;
k. physically transferring and/or storing for a set time period said second gaseous product mix and said first non-gaseous product mix for use in said second heat engine cycle;
l. increasing, to a set pressure, at least part of; p1 a purified first non-gaseous product from said second storage system;
m. preheating, with a fifth heat source, said pressurized first non-gaseous product to its point of conversion into a third gaseous product;
n. completely gasifying, with a sixth heat source, said preheated and pressurized first non-gaseous product to convert it into said third gaseous product;
o. increasing, to the pressure of said third gaseous product, at least part of a purified second gaseous product from said second storage;
p. matching, with a seventh heat source, the temperature of said pressurized second gaseous product to the temperature of said third gaseous product;
q. mixing, with a first mixer, said second gaseous product and said pressurized third gaseous product to make a pressurized combined gaseous product mix;
r. preheating, with an eighth heat source, said pressurized combined gaseous product mix to the temperature of an exothermic thermochemical reaction chamber;
s. passing said pressurized and preheated combined gaseous product mix into said exothermic thermochemical reaction chamber;
t. stimulating, with a chemical heat releaser, said pressurized and preheated combined gaseous product mix to cause said pressurized and preheated combined gaseous product mix to chemically release heat within said exothermic thermochemical reaction chamber during a process of changing said pressurized and preheated combined gaseous product mix into a second gaseous reactant mix, where said chemically released heat is used to power a heat engine;
u. expanding, with a second work-producing expander, said second gaseous reactant mix;
v. exhausting and cooling, with a third cooler, said expanded second gaseous reactant mix to the point where said expanded second gaseous reactant mix separates into a third gaseous reactant mix and a first non-gaseous reactant mix;
w. storing, in a third storage system, said third gaseous reactant mix and said first non-gaseous reactant mix; and
x. physically transferring and/or storing for a set time said stored third gaseous reactant mix and said first non-gaseous reactant mix for use in said first heat engine cycle.

2. The method of claim 1, wherein:
at least two of said first storage system, second storage system, or third storage system are the same storage system, and/or
at least two of said first heat source, second heat source, third heat source, fourth heat source, fifth heat source, sixth heat source, seventh heat source, or eighth heat source are the same heat source, and/or
said first work-producing expander and second work-producing expander are the same work-producing expander, and/or
at least two of said first cooler, second cooler, or third cooler are the same cooler.

3. The method of claim 1, wherein said first gaseous product mix from process (f) is superheated with a ninth heat source prior to being exhausted into said first work-producing expander for the expansion process (g), which expands said superheated gaseous product mix in said first work-producing expander and said first work-producing expander exhausts said first gaseous product mix from process (g).

4. The method of claim 3, wherein said first work-producing expander (g) is a first alternating expanded and heated multiple expander system, said first alternating expanded and heated multiple expander system being composed of multiple heaters interspersed between multiple expanders, where said first gaseous product mix is continually expanded and reheated until said first gaseous product mix reaches a pressure that is equal to the pressure of said first gaseous reactant.

5. The method of claim 1, wherein said second gaseous reactant mix from process (t) is superheated with a tenth heat source prior to being exhausted into said second work-producing expander for the expansion process (u), which expands said superheated second gaseous reactant mix in said second work-producing expander and said second work-producing expander exhausts said second gaseous reactant mix from process (u).

6. The method of claim 1, wherein, following said first expansion of said first gaseous product mix during process (g), said first gaseous product mix is passed through a first heat exchanger prior to entering said first cooler such that some or all of the latent heat existing in said first gaseous product mix following said first expansion of said first gaseous product mix is used, via said first heat exchanger, as heat elsewhere within the method.

7. The method of claim 1, wherein said chemically released heat within said exothermic thermochemical reaction chamber during process (t) is used as at least one source of heat with the method.

8. The method of claim 1, comprising:
y. separating, from a complete portion of said expanded first product mix from process (g), a second portion of said expanded first gaseous product mix;
z. adjusting, with a second heat exchanger, said second portion of expanded first gaseous product mix to the temperature of a second exothermic thermochemical reaction chamber;

aa. stimulating, with a chemical heat releaser, said second portion of expanded first gaseous product mix, causing said second portion of expanded first gaseous product mix to chemically release heat within said second exothermic thermochemical reaction chamber, thereby changing said second portion of expanded first gaseous product mix into a portion of second gaseous reactant mix, where said chemically released heat within said second exothermic thermochemical reaction chamber is used as at least one source of heat with the method;

bb. cooling, with a fourth cooler, said portion of second gaseous reactant mix to the point where said portion of second gaseous reactant mix separates into a third gaseous reactant mix and a second non-gaseous reactant mix; and cc. storing, in a fourth storage system, said third gaseous reactant mix and second non-gaseous reactant mix or recycling said third gaseous reactant mix and second non- gaseous reactant mix back into the said first storage system.

9. The method of claim 1, wherein said second gaseous product mix and/or said first non-gaseous product mix stored in said second storage system during process (j) is refined to product prior to being taken into an exothermic engine, and said third gaseous reactant mix and/or said first non-gaseous reactant mix stored in said third storage system during process (w) is refined to reactant prior to being taken into an endothermic engine.

10. A method for improving the overall thermal efficiency of a closed thermochemical and thermodynamic (chemo/thermodynamic) work-producing cycle comprising two independent open chemo/thermodynamic work-producing cycles, the two open chemo/thermodynamic work-producing cycles comprising a first heat engine cycle that chemically or endothermically absorbs heat in a reactant/reactant mix such that said reactant/reactant mix is converted to a product/product mix, and a second heat engine cycle that chemically or exothermically releases heat from said product/product mix to recreate at least part of said reactant/reactant mix, the method comprising:

a. in said second heat engine cycle, removing at least part of a first non-gaseous product from a first storage system;

b. pressurizing said first non-gaseous product to a set pressure;

c. preheating, with a first heat source, said pressurized first non-gaseous product to just below its point of conversion to a gaseous product;

d. completely gasifying, with a second heat source, said preheated and pressurized first non-gaseous product, said second heat source being released by condensation of a sufficient quantity of a first gaseous reactant mix at a higher pressure and temperature than said first non-gaseous product, said higher pressure of said first gaseous reactant mix assuring that the temperature of said condensing first gaseous reactant mix is sufficiently higher than the temperature required for gasification of said preheated and pressurized first non-gaseous product to effect said gasification and largely convert said first non-gaseous product into a first gaseous product;

e. compressing, with an Exothermic Reactor Exhaust Compressor (EREC), said first gaseous product to at least the pressure of said higher pressure first gaseous reactant mix;

f. removing, from a second storage system, at least part of said storage system's second gaseous product;

g. compressing said second gaseous product in a gaseous compressor to the pressure of said first gaseous reactant;

h. exhausting said second gaseous product into a third heat source, thus raising the temperature of said second gaseous product until said second gaseous product reaches the temperature of said first gaseous reactant;

i. mixing together, with a first mixer, said first gaseous product and second gaseous product to make a combined gaseous product;

j. preheating, with a fourth heat source, said combined gaseous product to the temperature of a first exothermic thermochemical reaction chamber;

k. passing said combined gaseous product into said first exothermic thermochemical reaction chamber;

l. stimulating, with a chemical heat releaser, said combined gaseous product to cause said combined gaseous product to chemically release heat within said exothermic thermochemical reaction chamber during a process of changing said combined gaseous product into said first gaseous reactant mix, where said chemically released heat is used to power a heat engine;

m. cooling, with a second cooler, said first gaseous reactant mix to a point just prior to said first gaseous reactant mix separating into a second gaseous reactant mix and a non-gaseous reactant mix;

n. separating said first gaseous reactant mix by condensing said first gaseous reactant mix into said second gaseous reactant mix and said non-gaseous reactant mix, with the absorption of heat through a heat transfer mechanism, said absorption of heat resulting from said first gaseous reactant mix at a higher pressure heating and thus gasifying in said heat transfer mechanism said first non-gaseous product, thus absorbing heat at a lower temperature in said first non-gaseous product where said heat is being released at a higher temperature in said condensing first gaseous reactant mix due to the pressure difference between the two streams;

o. further cooling, with a third cooler, said resulting non-gaseous reactant mix and said second gaseous reactant mix to the temperature of a second storage system; and p. storing, in said second storage system, said second gaseous reactant mix and said non-gaseous reactant mix for use in said first heat engine cycle.

11. The method of claim 10, wherein the heat absorbed within said second cooler during process (m) of said first gaseous reactant mix is used as at least one source of heat within the method of claim 10.

12. The method of claim 11, wherein the heat absorbed within said second cooler during process (m) of said first gaseous reactant mix is used to preheat said pressurized combined product to the temperature of said first exothermic thermochemical reaction chamber during process (j).

13. The method of claim 10, wherein said chemically released heat within said exothermic thermochemical reaction chamber during process (I) is used as at least one source of heat within the method.

14. The method of claim 10, wherein the compression of said second gaseous product exiting said second storage system is a first alternating compressed and cooled multiple compressor system, composed of multiple coolers interspersed between multiple compressors, said second gaseous product being compressed by said first alternating compressed and cooled multiple compressor system until said second gaseous product reaches a pressure that is equal to the pressure of said first gaseous reactant.

15. The method of claim 10 wherein, after the generation of said combined gaseous product during process (i):
- q. said combined gaseous product is compressed by a second compressor system composed of multiple compressors separated by multiple coolers;
- r. said multiply compressed and cooled combined gaseous product then is preheated with a portion of said exothermic reaction heat produced by an earlier cycle of said second engine cycle;
- s. said preheated combined gaseous product is further preheated with the said third heat source;
- t. said twice preheated combined gaseous product is further superheated with a fourth heat source;
- u. said superheated combined gaseous product is introduced to a first expansion system composed of multiple expanders separated by multiple heaters, where said first gaseous product is continually expanded and reheated until said second gaseous product reaches a pressure and temperature that is equal to the pressure and temperature of said first exothermic reaction chamber; and
- v. said combined gaseous product is introduced to said first exothermic thermochemical reaction chamber during process (k).

16. The method of claim 10, wherein a second alternating compressed and cooled multiple compressor system is used during process (g) to create said pressurized gaseous product and is located at a first location, and the resulting pressurized gaseous product is transported to a second location where the method continues after process (g).

17. The method of claim 10, wherein a location at which at least part of the method takes place is in the vicinity of a source of high temperature heat that is used as said third heat source for process (h).

18. The method of claim 10, wherein said chemically released heat during process (n) is used to generate heat for a heat engine.

* * * * *